United States Patent
Tamiya

(10) Patent No.: US 10,754,658 B2
(45) Date of Patent: Aug. 25, 2020

(54) INFORMATION PROCESSING APPARATUS, INFORMATION PROCESSING METHOD, AND COMPUTER-READABLE RECORDING MEDIUM

(71) Applicant: FUJITSU LIMITED, Kawasaki-shi, Kanagawa (JP)

(72) Inventor: Yutaka Tamiya, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 16/047,773

(22) Filed: Jul. 27, 2018

(65) Prior Publication Data

US 2019/0042271 A1 Feb. 7, 2019

(30) Foreign Application Priority Data

Aug. 2, 2017 (JP) .................................. 2017-149827

(51) Int. Cl.
| | |
|---|---|
| G06F 9/38 | (2018.01) |
| G06T 1/20 | (2006.01) |
| G06F 9/54 | (2006.01) |

(52) U.S. Cl.
CPC .......... *G06F 9/3885* (2013.01); *G06F 9/3877* (2013.01); *G06F 9/544* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 5,524,265 A | * | 6/1996 | Balmer | G06F 13/28 711/212 |
| 6,317,803 B1 | * | 11/2001 | Rasmussen | G06F 13/161 710/100 |
| 6,751,583 B1 | * | 6/2004 | Clarke | G06F 30/33 703/17 |
| 8,576,713 B2 | * | 11/2013 | Kamerkar | H04L 43/50 370/235 |
| 10,254,967 B2 | * | 4/2019 | Ouyang | G06F 3/061 |
| 2005/0251040 A1 | * | 11/2005 | Relkuntwar | H04L 67/12 600/437 |
| 2009/0019262 A1 | * | 1/2009 | Tashiro | G06F 9/3001 712/208 |
| 2017/0185533 A1 | * | 6/2017 | Rozas | G06F 12/1466 |

FOREIGN PATENT DOCUMENTS

| | | |
|---|---|---|
| JP | H05-158686 A | 6/1993 |
| JP | H11-053189 A | 2/1999 |

* cited by examiner

*Primary Examiner* — Michael Sun
(74) *Attorney, Agent, or Firm* — Fujitsu Patent Center

(57) ABSTRACT

An apparatus includes an arithmetic circuit that performs a pipeline operation on first data as an input; and a determination circuit that determines, based on pipeline operation results, whether to perform the pipeline operation by inputting, to the arithmetic circuit, second data different from the first data, wherein when the determination circuit has determined that the pipeline operation is to be performed by inputting the second data to the arithmetic circuit, the arithmetic circuit suspends the pipeline operation using the second data thereof, and performs the pipeline operation with the first data input until the second data is input, and when the second data is input, the arithmetic circuit resumes the pipeline operation using the second data.

11 Claims, 18 Drawing Sheets

INFORMATION PROCESSING APPARATUS, INFORMATION PROCESSING METHOD, AND COMPUTER-READABLE RECORDING MEDIUM

CROSS-REFERENCE TO RELATED APPLICATION

This application is based upon and claims the benefit of priority of the prior Japanese Patent Application No. 2017-149827, filed on Aug. 2, 2017, the entire contents of which are incorporated herein by reference.

FIELD

The embodiments discussed herein are related to an information processing apparatus, an information processing method, and a computer-readable recording medium.

BACKGROUND

Applications, such as high-performance computing, using a vast amount of data, have been used in high-speed and large-scale scientific computing fields, such as finite element method, electromagnetic field analysis, and fluid analysis. Higher-speed operation may be achieved by implementing the applications, which use array data, in the form of a hardware structure, for example, an accelerator including a field-programmable gate array (FPGA) or a graphics processing unit (GPU). A general-purpose computing on graphics processing units (GPGPU) has been recently used as an even higher-speed accelerator.

Accelerators using dedicated hardware, such as FPGA and/or GPU (GPGPU) draws attention and is being used because a large amount of increase in the throughput of an individual central processing unit (CPU) is difficult. A typical accelerator reads data from and write data to a large-capacity memory or storage via a data bus. Hardware constraints make it difficult to set the data transfer band (transfer rate) of the data bus to be wider than that of the CPU. On the other hand, an arithmetic circuit in the accelerator largely outperforms the CPU in throughput. To maximize the throughput of the accelerator, data to be used in the arithmetic circuit in the accelerator is to be supplied to the accelerator via the data bus at an appropriately desired timing.

Although the accelerator including a circuit, such as FPGA, greatly outperforms the CPU in throughput, the data transfer characteristics of the data bus place a limit on overall performance. Available as a technique to improve the throughput of the accelerator using the FPGA is a pipeline operation. The pipeline operation is a circuit configuration method that increases operation parallelism. In the pipeline operation, a process is divided into multiple stages of arithmetic circuits (also collectively referred to as an arithmetic circuit) such that each output becomes an input of a next stage, and the stages of the arithmetic circuit are concurrently operated.

A variety of techniques have been disclosed as information processing techniques to achieve even higher-speed operation through the pipeline operation.

The techniques described above are disclosed in Japanese Laid-open Patent Publication Nos. 11-053189 and 05-158686.

As described above, the accelerator using FPGA performs the pipeline operation. In applications where many types of data sets are handled, and the data set dynamically used varies during the pipeline operation, there is a possibility that performance drops.

The accelerator using the FPGA offers a higher throughput, but the number of pipeline stages tends to increase because of a narrow data transfer band. If the data set in use dynamically varies in the accelerator (information processing apparatus) having a large number of stages, the accelerator may request new input data from a host, or the pipeline operation is reset. Throughput is thus degraded.

It is thus contemplated that all possible data sets are transmitted from the host to the accelerator. In this case, however, data that is of no use is also transmitted to the accelerator. This may cause a lower data rate, leading to throughput degradation in the pipeline operation.

It is also contemplated that an execution path is segmented such that no branch occurs in the execution path of the pipeline operation. In this case, as well, intermediate data at a segmentation point is connected to an output and an input of the accelerator. This may also lead to throughput degradation in the pipeline operation.

SUMMARY

According to an aspect of the embodiments, an apparatus includes an arithmetic circuit that performs a pipeline operation on first data as an input; and a determination circuit that determines, based on pipeline operation results, whether to perform the pipeline operation by inputting, to the arithmetic circuit, second data different from the first data, wherein when the determination circuit has determined that the pipeline operation is to be performed by inputting the second data to the arithmetic circuit, the arithmetic circuit suspends the pipeline operation using the second data thereof, and performs the pipeline operation with the first data input until the second data is input, and when the second data is input, the arithmetic circuit resumes the pipeline operation using the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
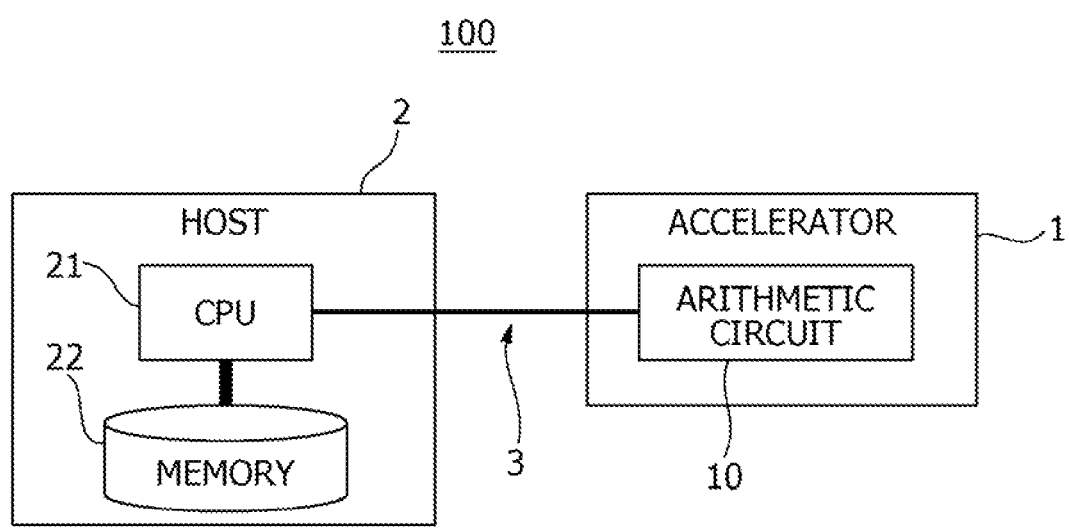
FIG. 1 is a block diagram schematically illustrating an example of an information processing server.

Examples and problems of an information processing apparatus are described below with reference to FIG. 1 through FIG. 7 before describing the information processing apparatus, an information processing method, and an information processing program. FIG. 1 is a block diagram schematically illustrating an example of an information processing server.

Referring to FIG. 1, an information processing server 100 includes a host 2, a data bus 3, and an accelerator 1. The host 2 includes a central processing unit (CPU) 21 and a memory 22. A field-programmable gate array (FPGA) including an arithmetic circuit 10 is used for the accelerator (information processing apparatus) 1. The accelerator 1 is not limited to the FPGA. The accelerator 1 may include dedicated hardware, such as a GPU or a general-purpose computing on graphics processing units (GPGPU).

The arithmetic circuit 10 in the accelerator 1 using the FPGA or the like in the information processing server 100 reads data from the large-capacity memory 22 in the host 2 via the data bus 3, and writes data onto the large-capacity memory 22 in the host 2 via the data bus 3.

Hardware constraints make it difficult to set the data transfer band (transfer rate) of the data bus to be wider than that of the CPU 21. On the other hand, the arithmetic circuit 10 in the accelerator 1 largely outperforms the CPU 21 in throughput. To maximize the throughput of the accelerator 1, data to be used in the arithmetic circuit 10 in the accelerator 1 is to be supplied to the accelerator 1 via the data bus 3 at an appropriately desired timing.

Figure 2A:
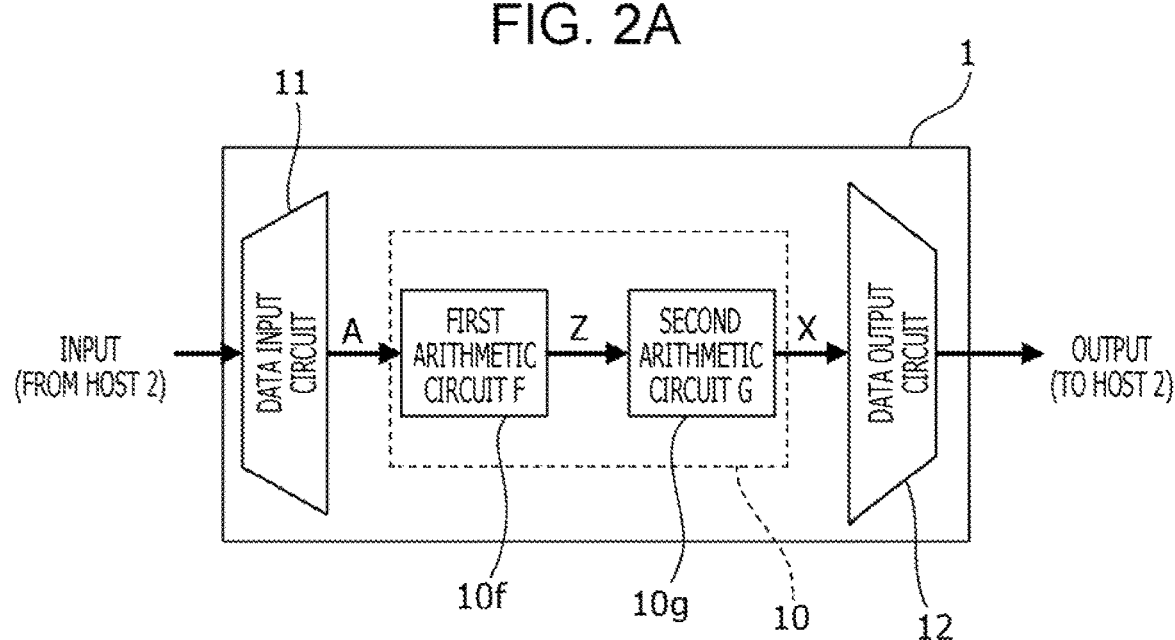
FIG. 2A is a block diagram schematically illustrating a configuration of an accelerator.
Figure 2B:
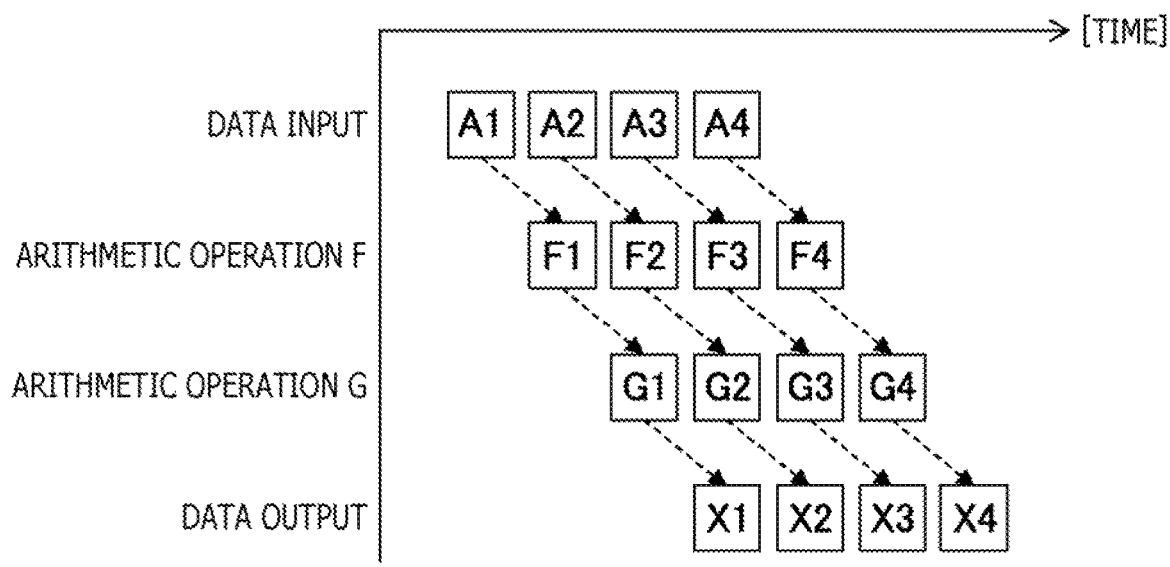
FIG. 2B illustrates an example of a pipeline execution performed on each piece of data by the accelerator.

Available as a technique to improve the throughput of hardware is a pipeline operation. FIG. 2A and FIG. 2B illustrate an example of the pipeline operation of the information processing apparatus 1. FIG. 2A is a block diagram schematically illustrating a configuration of the accelerator 1, and FIG. 2B illustrates an example of a pipeline execution performed on each piece of data by the accelerator 1.

Referring to FIG. 2A, the arithmetic circuit 10 is segmented into multiple stages, namely, arithmetic circuits 10*f* and 10*g* such that an output from one stage becomes an input to another stage, and operation parallelism is increased by causing the arithmetic circuits 10*f* and 10*g* to concurrently operate.

More specifically, the accelerator 1 of FIG. 2A includes as the arithmetic circuit 10, two arithmetic circuits, the first arithmetic circuit 10*f* and the second arithmetic circuit 10*g*. More specifically, the first arithmetic circuit 10*f* reads A as an input from the host 2, performs an arithmetic operation F on A, and outputs data (intermediate data) Z, and the second arithmetic circuit 10*g* reads data Z as an input from the first arithmetic circuit 10*f*, performs an arithmetic operation G on the data Z, and outputs data (output data) X to the host 2.

Referring to FIG. 2B, in the pipeline operation, each piece of the data A is shifted in the order of input data A (A1, A2, A3, . . . ), operations F (F1, F2, F3, . . . ) are respectively performed, operations G (G1, G2, G3, . . . ) are respectively performed and output data (X1, X2, X3, . . . ) are then output. The accelerator 1 consecutively reads data A before outputting data X responsive to data A, leading to an increase in the throughput.

The input data A is to be supplied without delay to achieve a higher throughput in the pipeline operation. Since the data transfer band is narrower in view of the throughput in the accelerator 1, the number of states of a pipeline circuit, namely, the number of pipeline stages tends to increase. The increase in the number of pipeline stages is pronounced in the accelerator 1 having a higher throughput FPGA but a narrower data transfer band.

Figure 3:
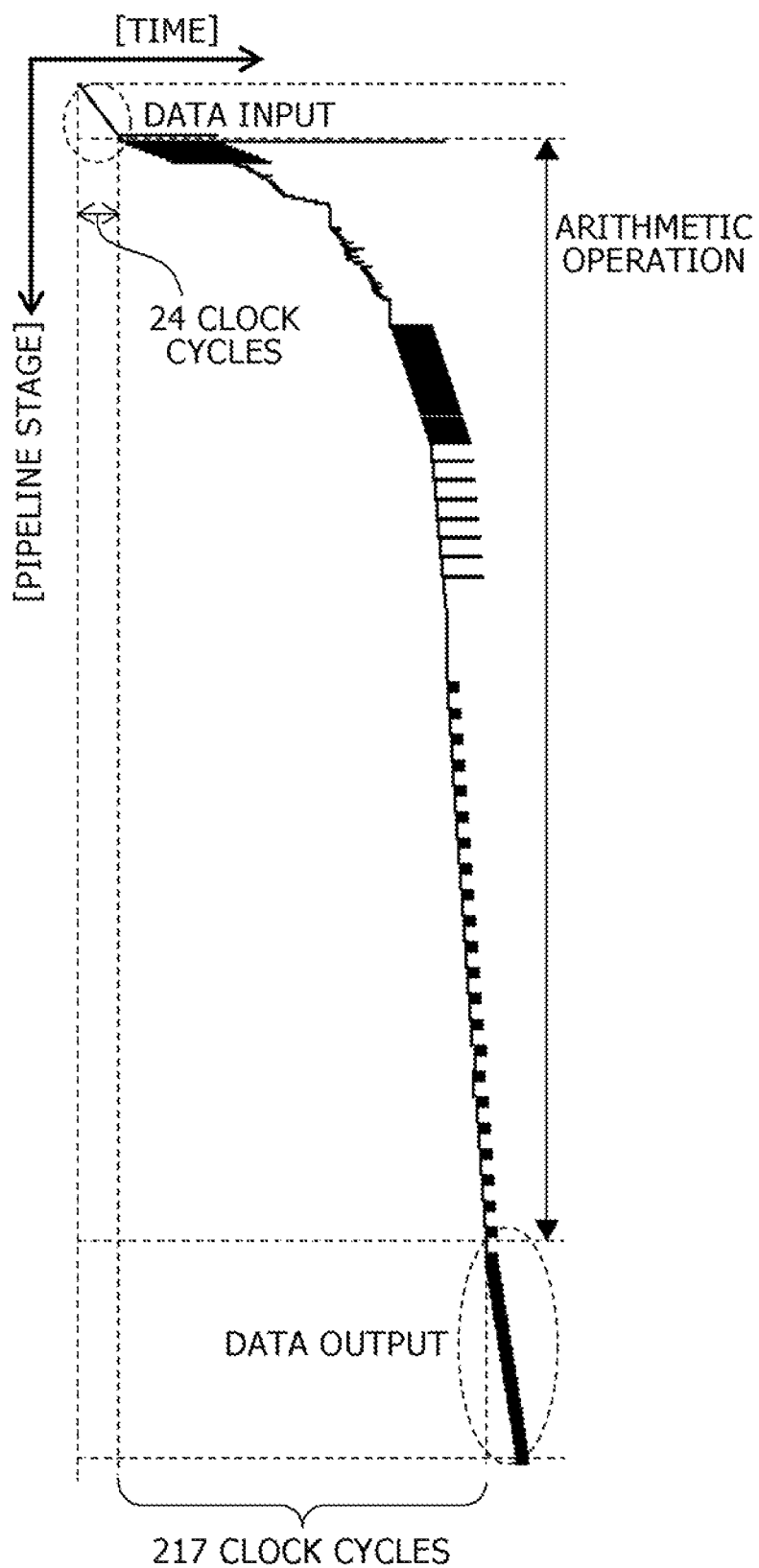
FIG. 3 illustrates an example of an operation that is performed when a finite element method application is implemented on a pipeline circuit in an information processing apparatus.

FIG. 3 illustrates an example of an operation that is performed when a finite element method application is implemented on a pipeline circuit in the information processing apparatus. Referring to FIG. 3, data is input for a period of 24 clock cycles, and an arithmetic operation is performed through 271 pipeline stages, and resulting data is output. As illustrated in FIG. 3, the arithmetic operation is performed during a time period (271 clock cycles) 10 times as long as a data input time period (24 clock cycles), and the pipeline operation is thus efficiently performed.

Figure 4A:
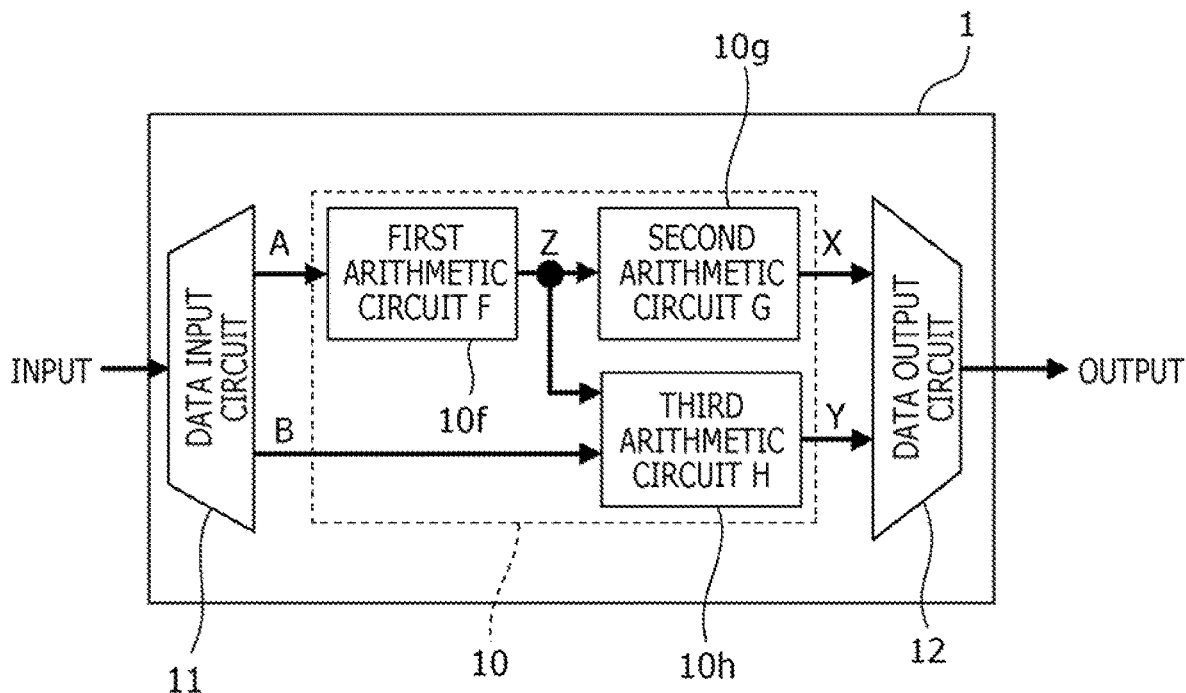
FIG. 4A is a block diagram schematically illustrating a configuration of an accelerator.
Figure 4B:
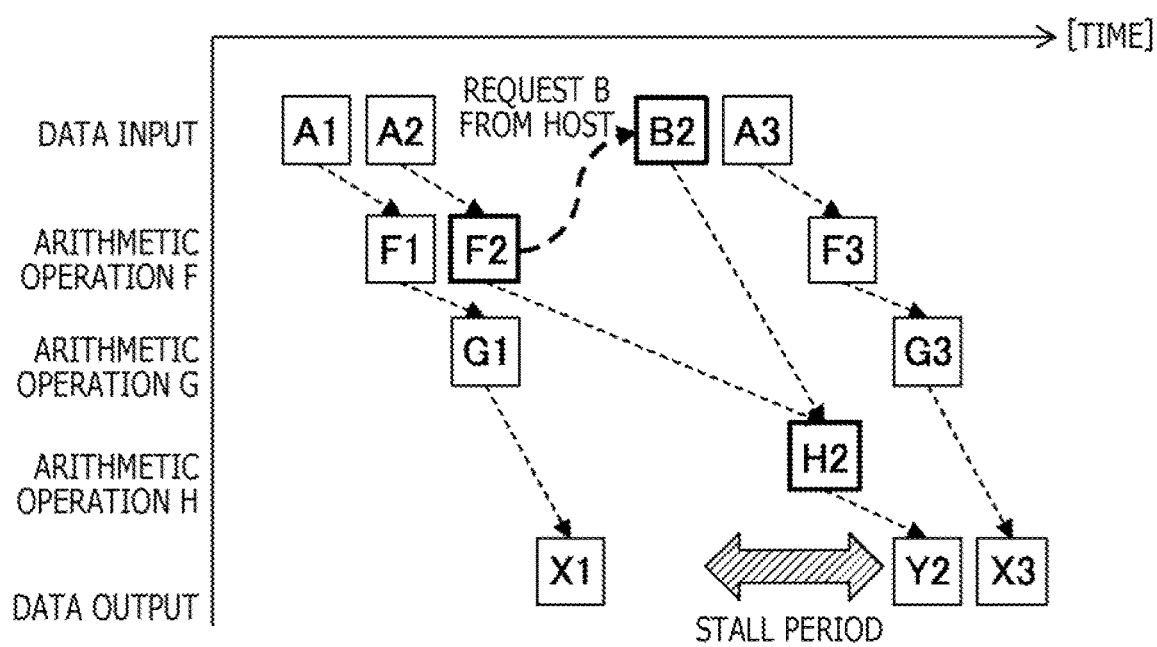
FIG. 4B illustrates an example of the pipeline execution performed on each piece of data by the accelerator in another example of the pipeline operation of the information processing apparatus.

FIG. 4A and FIG. 4B illustrate another example of the pipeline operation of the information processing apparatus. FIG. 4A is a block diagram schematically illustrating a configuration of the accelerator 1. FIG. 4B illustrates an example of the pipeline execution performed on each piece of data by the accelerator 1 of FIG. 4A. Referring to FIG. 4B, the pipeline operation of the accelerator 1 dynamically waits for the inputting of second piece of input data.

The arithmetic circuit 10 in the accelerator 1 of FIG. 4A includes three arithmetic circuits, including a first arithmetic circuit 10*f*, a second arithmetic circuit 10*g* and a third arithmetic circuit 10*h*. The first arithmetic circuit 10*f* reads A as an input from the host 2, performs an arithmetic operation F on A, and outputs intermediate data Z. The second arithmetic circuit 10*g* reads Z as an input from the first arithmetic circuit 10*f*, performs an operation G on Z, and outputs output data X to the data output circuit 12.

The third arithmetic circuit 10*h* reads B as an input from the host 2, and Z as an input from the first arithmetic circuit 10*f*, performs an arithmetic operation H on these inputs, and outputs output data Y to the data output circuit 12. The data output circuit 12 includes a multiplexer, and selects the data X from the second arithmetic circuit 10*g* or the data Y from the third arithmetic circuit 10*h*, and outputs the selected data to the host 2.

Referring to FIG. 4A and FIG. 4B, the type of input data (input data A and B) that will undergo the arithmetic operation is not fixed but changed. As illustrated in FIG. 4A and FIG. 4B, the arithmetic circuit 10 receives only A and outputs X in a normal operation, but if the intermediate data Z satisfies a given condition, the arithmetic circuit 10 separately reads B, performs the arithmetic operation H on the data B, and outputs the output data Y to the host 2.

Referring to FIG. 4B, after the arithmetic operation F (F2) is performed on second input data A (A2), the input data B (B2) is determined to be a necessity. In such a case, the accelerator 1 request the host 2 to send the input data B2. In response to the request from the accelerator 1, the host 2 transfers the data B2 to the accelerator 1 via the data bus 3. The third arithmetic circuit 10h in the accelerator 1 reads the data B (B2), and performs the arithmetic operation H on the data B (B2), and outputs the output data Y (Y2) to the host 2.

If the type of input data used in the arithmetic operation of the accelerator 1 changes during the operation, a stall (suspension) period of the pipeline occurs, possibly causing throughput degradation. Particularly, the accelerator 1 using the FPGA or the like has a large number of pipeline stages. When the accelerator 1 requests new input data B to be input and processes the input data B, another pipeline operation is reset and the effect of the throughput degradation is pronounced.

Figure 5A:
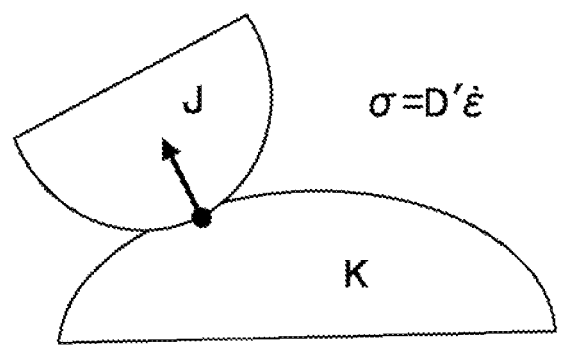
FIG. 5A and FIG. 5B illustrate contact analysis in an elastoplastic finite element method as an example of an application performed by the information processing apparatus.
Figure 5B:
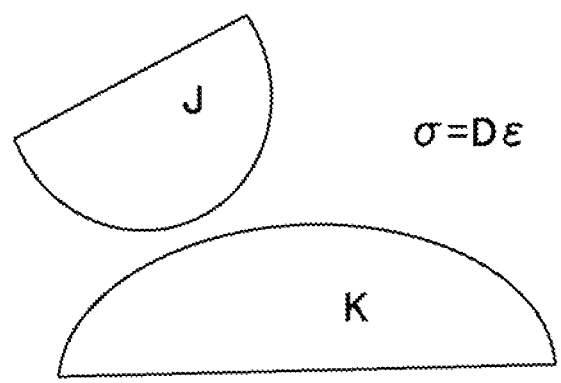

FIG. 5A and FIG. 5B illustrate contact analysis in an elastoplastic finite element method as an example of an application performed by the information processing apparatus. FIG. 5A illustrates an elastoplastic body J that is in contact with a target K, and FIG. 5B illustrates the elastoplastic body J that is spaced apart from the target K.

If the application performed by the information processing apparatus (accelerator) 1 is the contact analysis in the elastoplastic finite element method that handles multiple data sets, two cases are contemplated as illustrated in FIG. 5A where the elastoplastic body J is in contact with the target K and as illustrated in FIG. 5B where the elastoplastic body J is spaced apart from the target K. If the elastoplastic body J is in contact with the target K as illustrated in FIG. 5A, the elastoplastic body J continuously receives an external force from the target K, and the plastic analysis is performed on the elastoplastic body J. For example, let D' represent a rigid plasticity matrix, and $\varepsilon$ dot (with a dot on top thereof) represent a strain rate, and stress $\sigma$ is calculated as expressed by the following formula:

$$\sigma = D' \dot{\varepsilon}$$

If the elastoplastic body J is spaced apart from the target K as illustrated in FIG. 5B, the elastoplastic body J does not receive a force from the target K, and elastic analysis is performed on the elastoplastic body J. Let D represent an elastic matrix, and $\varepsilon$ represent a strain rate, and stress $\sigma$ is calculated as expressed by the following formula:

$$\sigma = D\varepsilon$$

Whether the case of FIG. 5A or the case of FIG. 5B is applicable is determined by dynamically determining whether a force the elastoplastic body J receives from the target K is in a direction in which the elastoplastic body J is pressed. Depending on the determination results, which data set $\{D', \varepsilon \text{ dot}\}$ or $\{D, \varepsilon\}$ to use in the calculation of the stress $\sigma$ is determined. In the contact analysis in the elastoplastic finite element method of FIG. 5A and FIG. 5B, the pipeline operation described with reference to FIG. 4A and FIG. 4B is performed. The application of the pipeline operation is not limited to the contact analysis in the elastoplastic finite element method but finds applications in a variety of other fields.

Figure 6A:
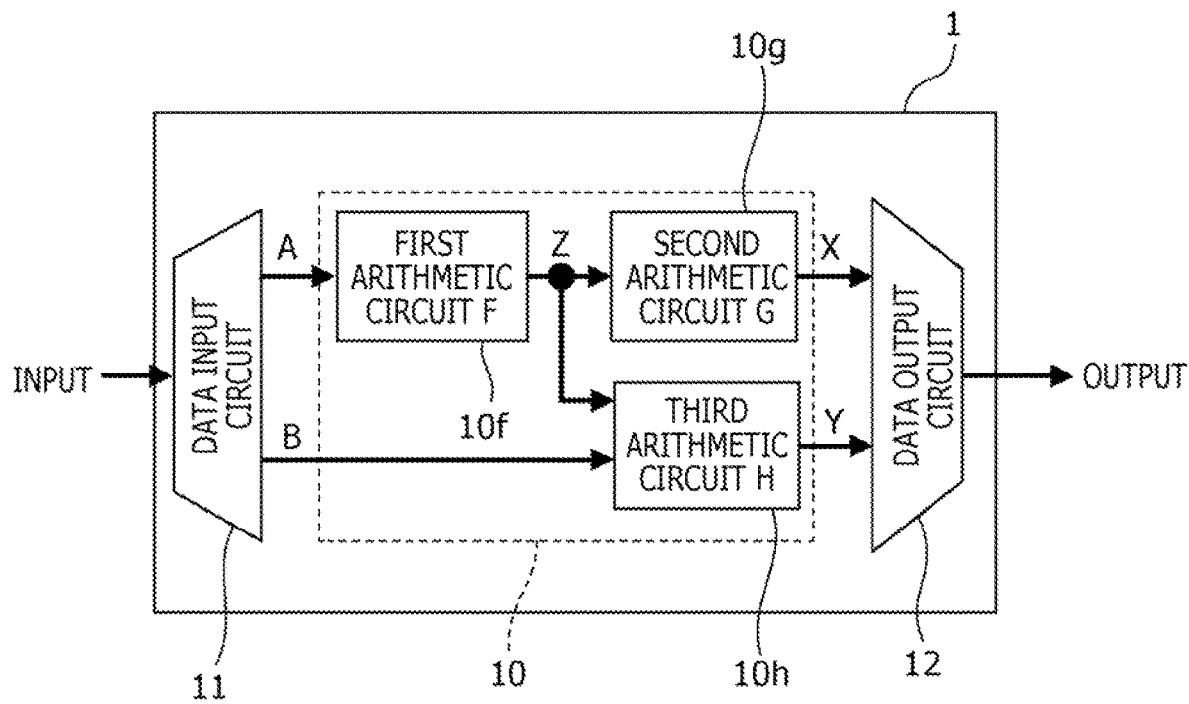
FIG. 6A and FIG. 6B illustrate an example of a solution methodology of the information processing apparatus.
Figure 6B:
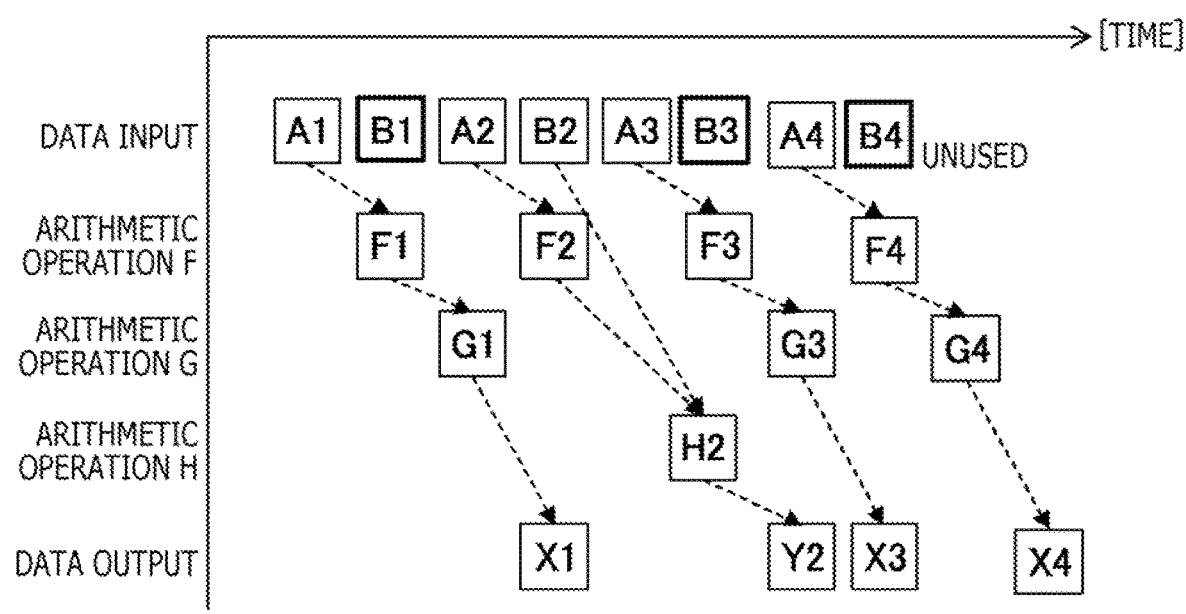

FIG. 6A and FIG. 6B illustrate an example of a solution methodology of the information processing apparatus. FIG. 6A is identical to FIG. 4A. FIG. 6B is similar to FIG. 4B. FIG. 6A and FIG. 6B illustrate an example of the solution methodology that has been described with reference to FIG. 4A and FIG. 4B.

If the type of input data changes that is used in the arithmetic operation of the accelerator 1 as described with reference to FIG. 4A and FIG. 4B, a stall (suspension) time period of the pipeline occurs, possibly causing throughput degradation of the accelerator 1. In one contemplated configuration as illustrated in FIG. 6B, applications handling multiple types of data sets are configured to be a pipeline, and all possible data sets (input data B: B1, B2, B3, . . . ) are transmitted to the accelerator 1. The input data B that is actually used in the accelerator 1 is only B2 as described with reference to FIG. 4B, and B1, B3, B4, . . . are of no use.

If all possible data sets are transmitted to the accelerator 1, data that is of no use is also transmitted to the accelerator 1. This leads to a slower data rate, and as a result, the throughput of the pipeline operation is degraded. Furthermore, an increase in the number of data sets may further cause a drop in throughput.

Figure 7A:
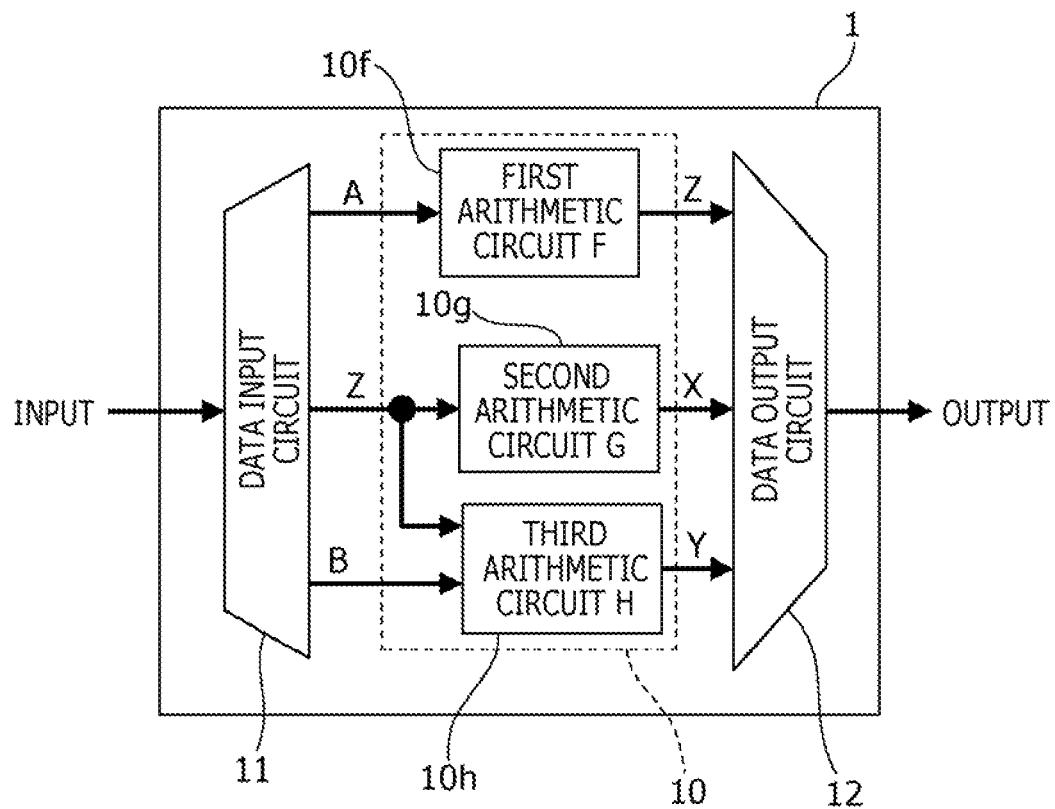
FIG. 7A and FIG. 7B illustrate another example of the solution methodology of the information processing apparatus.
Figure 7B:
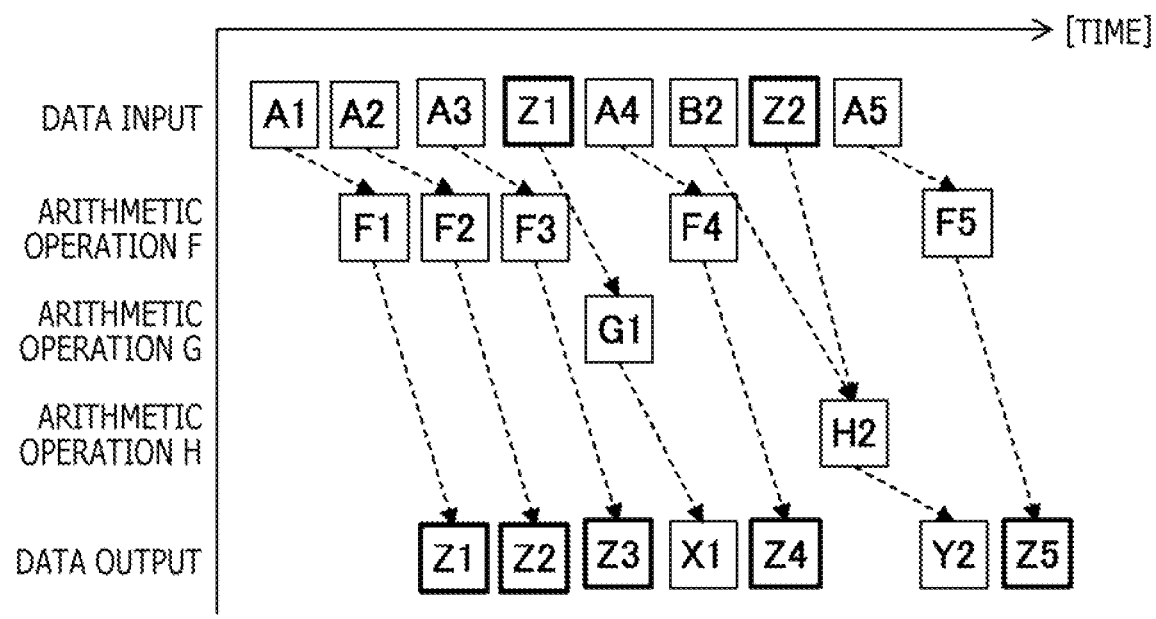

FIG. 7A and FIG. 7B illustrate another example of the solution methodology of the information processing apparatus. FIG. 7A is a block diagram schematically illustrating the configuration of the accelerator 1. An execution path is segmented such that an execution path of the pipeline has no branch. More specifically, when the execution path is segmented, the intermediate data (Z) at a segmentation point is linked to an output and an input of the accelerator 1. FIG. 7B is similar to FIG. 4B and FIG. 6B, and illustrates an example of the pipeline operation of the accelerator 1 of FIG. 7A.

By comparison of FIG. 7A with FIG. 4A (FIG. 6A), in the accelerator 1 of FIG. 7A, the data input circuit 11 inputs input data A to the first arithmetic circuit 10f, input data Z to the second arithmetic circuit 10g, and input data Z and B to the third arithmetic circuit 10h. The first arithmetic circuit 10f outputs output data Z to the data output circuit 12, the second arithmetic circuit 10g outputs output data X to the data output circuit 12 and the third arithmetic circuit 10h outputs output data Y to the data output circuit 12.

The input data A, Z, and B are input to the arithmetic circuits 10f, 10g, and 10h via the data input circuit 11 from the host 2, and the output data Z, X, and Y are output from the arithmetic circuits 10f, 10g, and 10h to the host 2 via the data output circuit 12. Since an execution path (the arithmetic circuits 10f, 10g, and 10h) of the pipeline is identified by a data set transmitted from the host 2, a stall of the pipeline operation is thus controlled.

However, if the execution path is segmented as illustrated in FIG. 7B, transmission and reception of the intermediate data (Z: Z1, Z2, . . . ) are added in the data output circuit 12 and the data input circuit 11. In the same way described with reference to FIG. 6A and FIG. 6B, the intermediate data Z is exchanged with the host 2 via the data output circuit 12 or the data input circuit 11. This may cause a delay in the data rate or throughout degradation in the pipeline operation.

Figure 8:
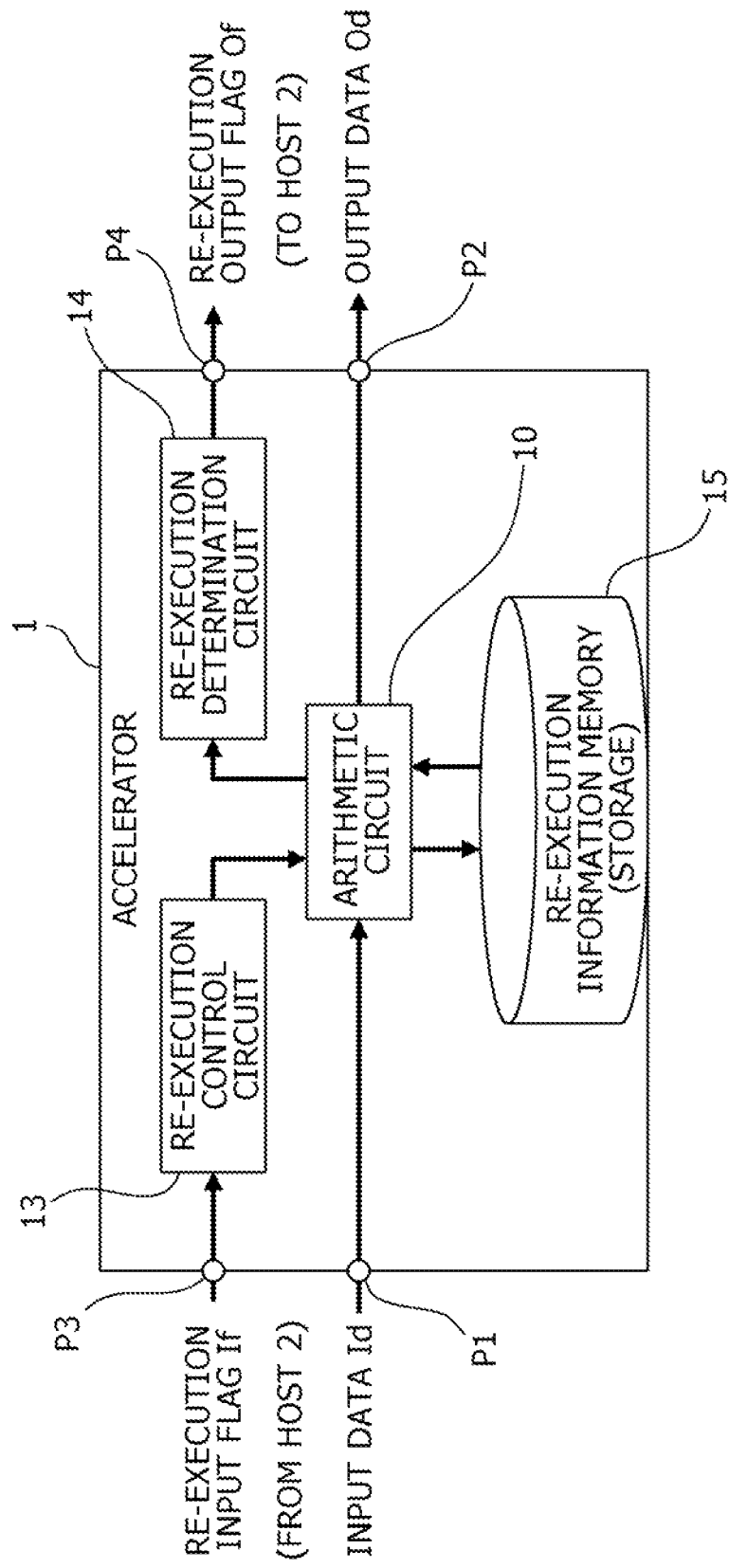
FIG. 8 is a block diagram schematically illustrating an information processing apparatus of an embodiment.

The information processing apparatus, information processing method, and information processing program as embodiments are described in detail with reference to the drawings. FIG. 8 is a block diagram schematically illustrating the information processing apparatus of an embodiment. Referring to FIG. 8, the information processing apparatus (accelerator) 1 of the embodiment includes an arithmetic circuit 10, a re-execution control circuit 13, a re-execution determination circuit 14, and a re-execution information memory 15. The accelerator 1 may include FPGA and/or GPU (GPGPU), and performs the pipeline operation as described previously.

The accelerator 1 includes an input data port P1 that reads input data from the host 2, and an output data port P2 that writes output data onto the host 2. The accelerator 1 also includes a re-execution input flag port P3 that receives a "re-execution input flag" indicating whether the input data is used for re-execution, and a re-execution output flag port P4 that outputs a "re-execution output flag" indicating whether the output data is to be re-executed.

The re-execution control circuit 13 instructs the arithmetic circuit 10 to re-execute the pipeline operation in response to the re-execution input flag input via the port P3, and the re-execution determination circuit 14 determines, based on pipeline operation results of the arithmetic circuit 10, whether the re-execution is to be performed. The re-execution output flag from the re-execution determination circuit 14 is output via the port P4. The re-execution information memory 15 stores information, such as interim results, in preparation for the re-execution.

Figure 9:
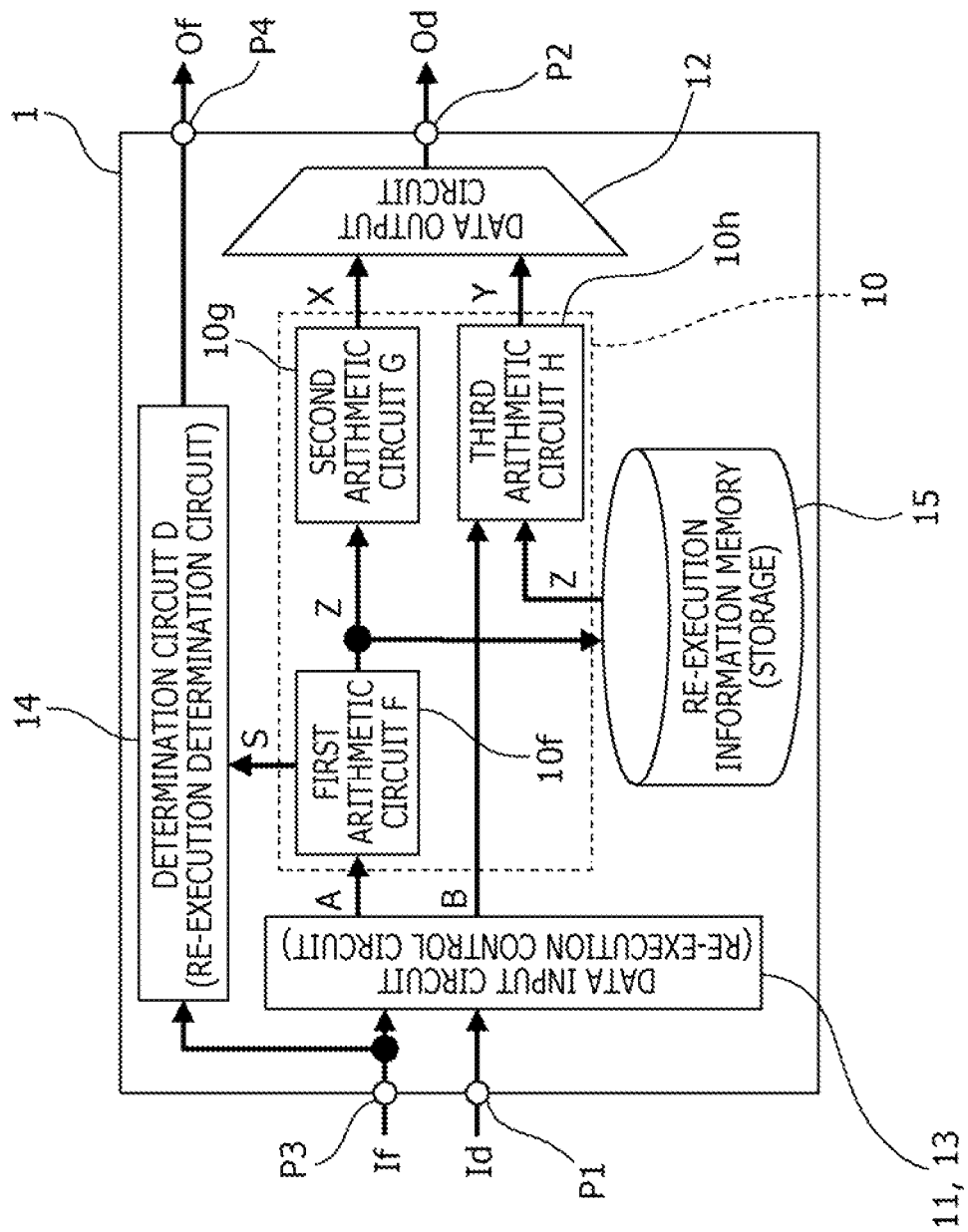
FIG. 9 is a block diagram schematically illustrating an information processing apparatus of a first embodiment.

FIG. 9 is a block diagram schematically illustrating the information processing apparatus of a first embodiment corresponding to the information processing apparatuses of FIG. 4A and FIG. 6A. Referring to FIG. 9, the information processing apparatus (accelerator) 1 of the first embodiment includes a data input circuit 11 (a re-execution control circuit 13), a data output circuit 12, a determination circuit D (the re-execution determination circuit) 14, and a re-execution information memory 15. The arithmetic circuit 10 includes a first arithmetic circuit 10f that performs an arithmetic operation F on data A, a second arithmetic circuit 10g that performs an arithmetic operation G on data (intermediate data) Z, and a third arithmetic circuit 10h that performs an arithmetic operation H on the data B and Z. A re-execution control circuit 13 is not clearly illustrated in FIG. 9 (and FIG. 10 through FIG. 12, FIG. 14A, FIG. 15A, . . . ), but the data input circuit 11 has a functionality of the re-execution control circuit 13.

By comparison of FIG. 9 with FIG. 4A and FIG. 6A, the first arithmetic circuit 10f inputs the intermediate data Z to the re-execution information memory 15 rather than the third arithmetic circuit 10h in the accelerator 1 of the first embodiment. The third arithmetic circuit 10h receives input data B from the data input circuit 11 and the data (intermediate data) Z from the re-execution information memory 15, and performs the arithmetic operation G on the input data B and the intermediate data Z, and outputs output data Y to the data output circuit 12. Note that the data output circuit 12 includes a multiplexer, selects between the data X from the second arithmetic circuit 10g and the data Y from the third arithmetic circuit 10h, and outputs the selected data to the host 2.

In the accelerator 1 of the first embodiment, the intermediate data Z from the first arithmetic circuit 10f is input to the third arithmetic circuit 10h via the re-execution information memory 15. A re-execution input flag If from the host 2 (CPU 21) is input to the data input circuit 11 (the re-execution control circuit 13) and the determination circuit (re-execution determination circuit) 14 via a port P3. A re-execution output flag Of from the determination circuit 14 is input to the host 2 (CPU 21) via a port P4. The determination circuit 14 performs determination by receiving the re-execution input flag If and a signal S from the first arithmetic circuit 10f, and outputs the re-execution output flag Of.

Figure 10:
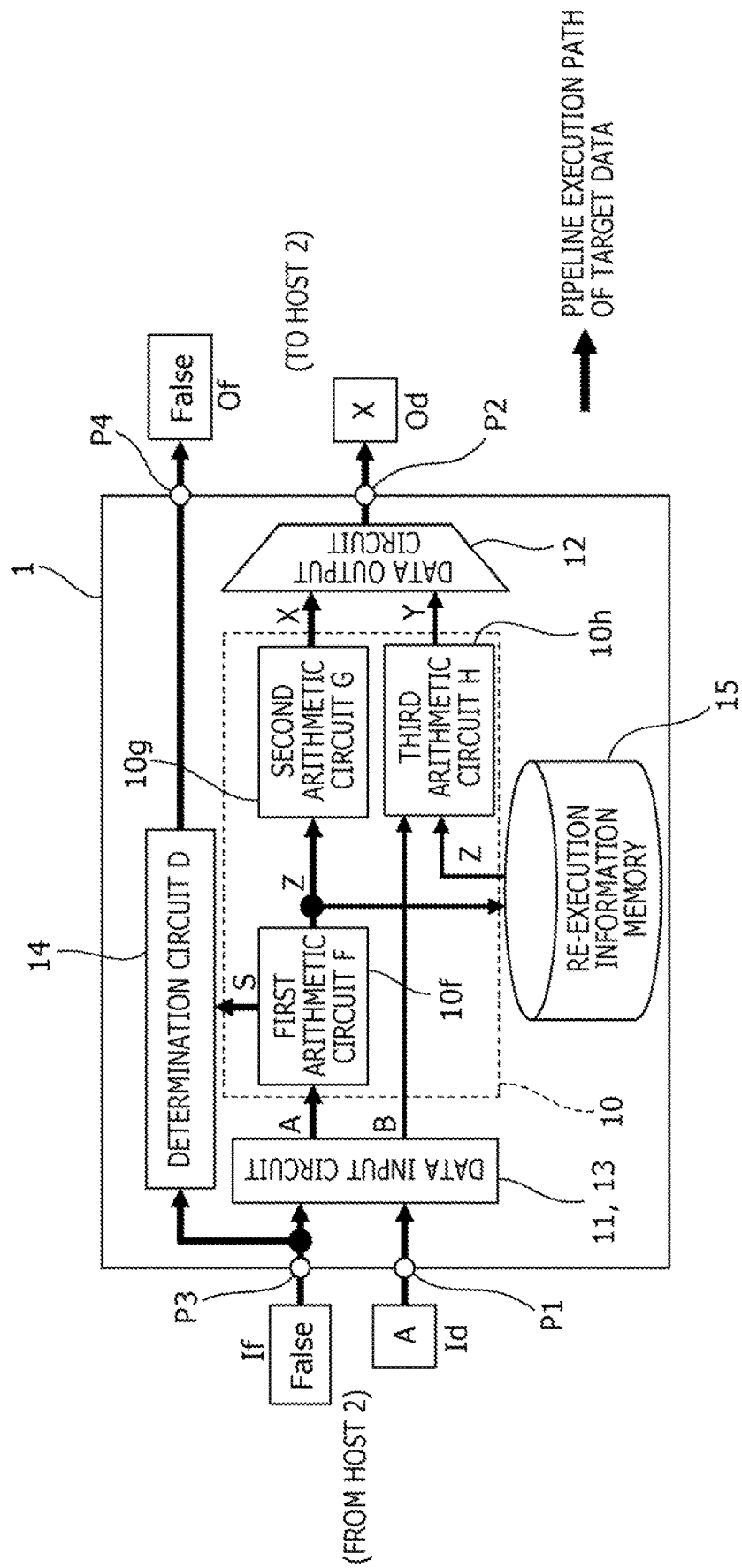
FIG. 10 illustrates a first example of the pipeline operation of the information processing apparatus of FIG. 9.
Figure 11:
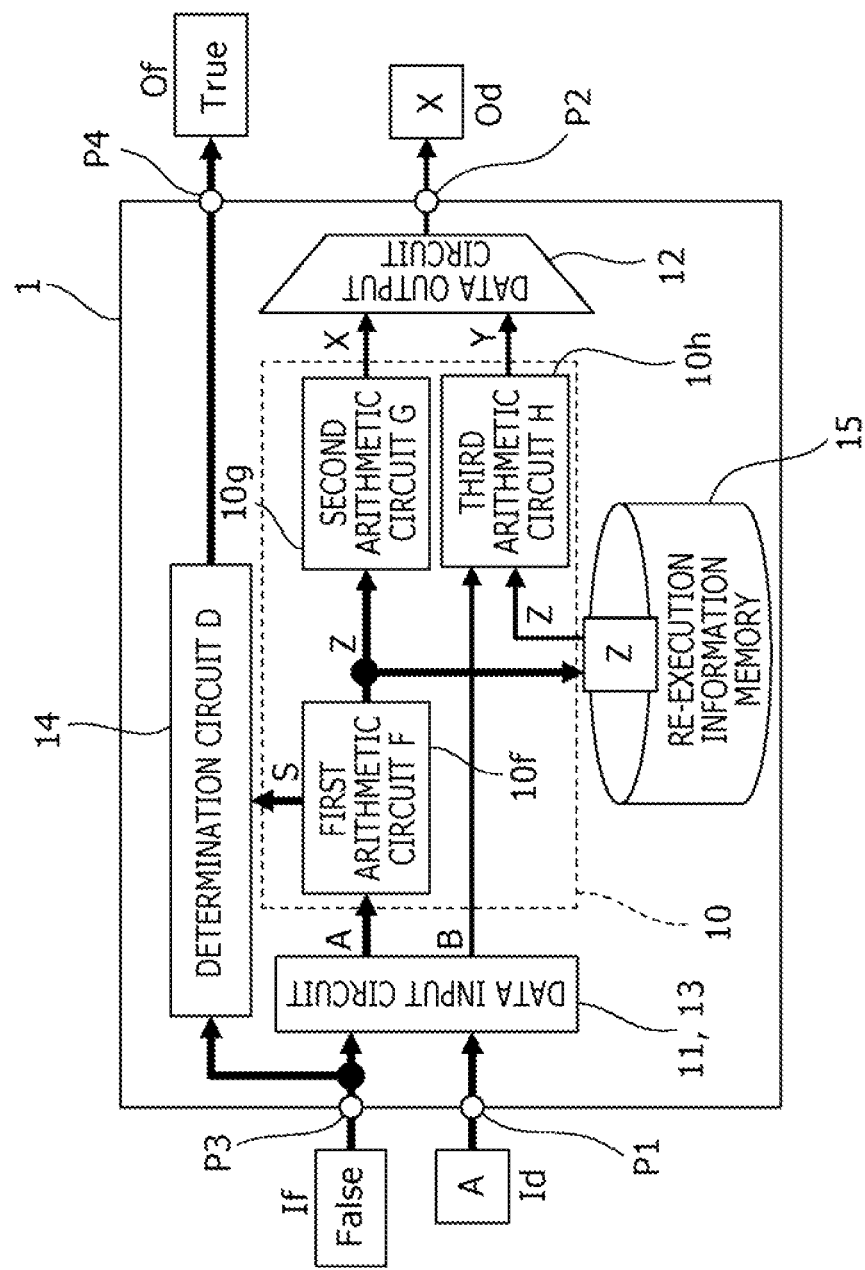
FIG. 11 illustrates a second example of the pipeline operation of the information processing apparatus of FIG. 9.
Figure 12:
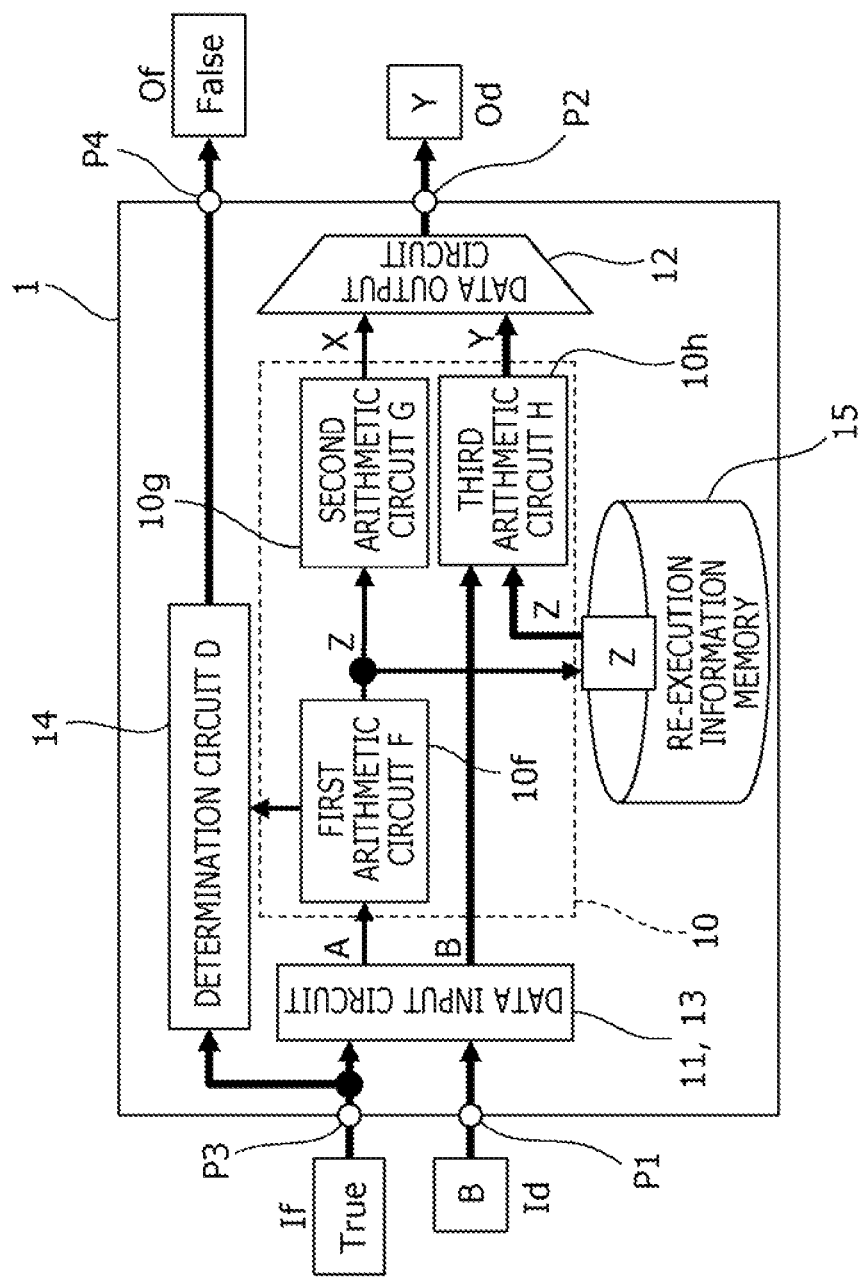
FIG. 12 illustrates a third example of the pipeline operation of the information processing apparatus of FIG. 9.

FIG. 10 through FIG. 12 illustrate an example of a process of the information processing apparatus of FIG. 9. FIG. 10 illustrates an example of the process of the information processing apparatus of FIG. 9 in which the re-execution is not to be performed. FIG. 11 illustrates an example of the pipeline operation of the information processing apparatus of FIG. 9 in which the re-execution is to be performed. FIG. 12 illustrates an example of the pipeline operation of the information processing apparatus of FIG. 9 in which the re-execution is not to be performed after the re-execution is performed.

A true re-execution input flag If indicates that the input data is data for the re-execution, and a false re-execution input flag If indicates that the input data is not data for the re-execution. A true re-execution output flag Of indicates that the output data is data that involves the re-execution, and a false re-execution output flag Of indicates data that does not involve the re-execution.

Referring to FIG. 10 and FIG. 11, the case of the false re-execution input flag If, namely, the case that the type of input data is only A is described below. Referring to FIG. 10, the data input circuit 11 (the re-execution control circuit 13) receives the false re-execution input flag If and the input data A, and outputs the data A to the first arithmetic circuit 10f. The first arithmetic circuit 10f receives the data A, performs the arithmetic operation F on the data A, and outputs the output data (intermediate data) Z to the second arithmetic circuit 10g. The second arithmetic circuit 10g receives the data Z, performs the arithmetic operation G on the data Z, and outputs the output data Z to the data output circuit 12.

The determination circuit 14 receives the signal S from the first arithmetic circuit 10f and the false re-execution input flag If. If the determination circuit 14 determines in response to the signal S that the re-execution is not to be performed, the determination circuit 14 generates the false re-execution output flag Of. Output data X of the second arithmetic circuit 10g is output to the host 2 from the data output circuit 12 via the port P2 while at the same time the false re-execution output flag Of generated by the determination circuit 14 is output to the host 2 via the port P4. In this way, the host 2 (CPU 21) receives the false re-execution output flag Of together with the output data X, and recognizes that the operation performed by the accelerator 1 is free from re-execution, and outputs data to the accelerator 1 for a next operation.

Referring to FIG. 11, the case that the re-execution input flag If is false but the re-execution is still to be performed. During the inputting to the accelerator 1, the data input circuit 11 receives the false re-execution input flag If and the input data A, and outputs the data A to the first arithmetic circuit 10f in a way similar to the way described with reference to FIG. 10. The first arithmetic circuit 10f receives the data A, performs the arithmetic operation F on the data A, and outputs the intermediate data Z to the re-execution information memory 15. The re-execution information memory 15 stores the received intermediate data Z thereon. The second arithmetic circuit 10g recognizes that the re-execution of the arithmetic operation F is to be performed by the first arithmetic circuit 10f, and halts (suspends) the operation.

The determination circuit 14 receives the signal S from the first arithmetic circuit 10f, and the false re-execution input flag If but if the determination circuit 14 determines, based on the signal S, that the re-execution is to be performed, the determination circuit 14 generates the true re-execution output flag Of. More specifically, if the re-execution of the arithmetic operation F is to be performed by the first arithmetic circuit 10f, the determination circuit 14 generates the true re-execution output flag Of instead of the false re-execution output flag Of and outputs the true re-execution output flag Of to the host 2 via the port P4. By receiving the true re-execution output flag Of, the host 2 recognizes that the operation performed by the accelerator 1 is to be re-executed, and outputs to the accelerator 1 additional data B for the re-execution. More specifically, the host 2 recognizes the necessity for the re-execution, and outputs to the accelerator 1 the data B together with the true re-execution input flag If illustrated as in FIG. 12.

If the re-execution is to be performed as illustrated in FIG. 12, the data input circuit 11 receives the true re-execution input flag If and the input data B, and outputs the data B to the third arithmetic circuit 10h. When the input data B is ready on the host 2, the accelerator 1 receives the input data B together with the true re-execution input flag If and performs the re-execution. The third arithmetic circuit 10h performs the arithmetic operation H by receiving the input data B together with the data (intermediate data) Z stored on the re-execution information memory 15, and outputs the output data Y to the data output circuit 12. The determination circuit 14 then receives the true re-execution input flag If and the determination circuit 14 generates the false re-execution output flag Of if it determines that the re-execution is not to be performed again after the re-execution.

The output data Y of the third arithmetic circuit 10h is output to the host 2 from the data output circuit 12 via the port P2, and at the same time, the false re-execution output flag Of generated by the determination circuit 14 is output to the host 2 via the port P4. In this way, the host 2 receives the false re-execution output flag Of together with the output data Y, and recognizes that the operation performed by the accelerator 1 is free from the re-execution, and then outputs data for the next operation to the accelerator 1. For convenience of explanation, three arithmetic circuits 10f, 10g, and 10h are used and a single piece of the intermediate data Z is processed as illustrated in FIG. 10 through FIG. 12. A more number of arithmetic circuits and a more number of pieces of intermediate data are used. More specifically, multiple arithmetic circuits corresponding to the first arithmetic circuit 10f, the second arithmetic circuit 10g, and the third arithmetic circuit 10h may be used, and accordingly, multiple pieces of intermediate data may be used.

Figure 13:
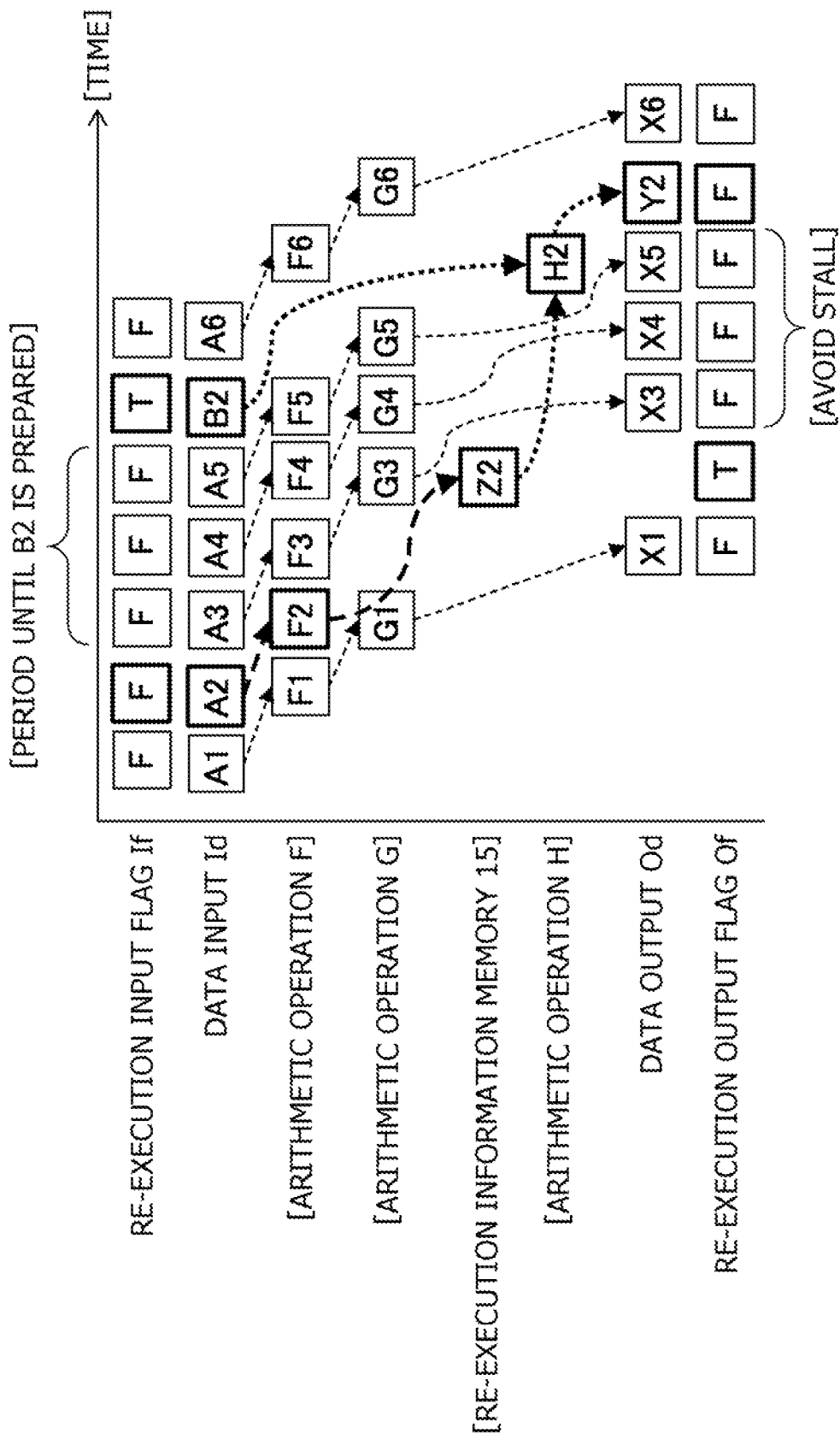
FIG. 13 illustrates an example of the pipeline operation of the information processing apparatus of FIG. 9.

FIG. 13 illustrates an example of the pipeline operation of the information processing apparatus of FIG. 9. If the frequency of performing the re-execution (input data B) is lower, a decrease in the data transfer band is negligible, and a maximum pipeline operation throughput may be achieved. In the re-execution operation of FIG. 13, the re-execution input flag If is set to be true, and input data B2 is input. The third arithmetic circuit 10h receives data (intermediate data) Z2 read from the re-execution information memory 15 and the input data B2, performs the arithmetic operation H2, and outputs data Y2. As previously described, when the output data Y2 is output to the host 2, the re-execution output flag Of is set to be false.

If the re-execution is to be performed (as illustrated by a thick-broken line path of FIG. 13), the stall of the pipeline operation is precluded by suspending the operation by storing the intermediate data Z (Z2) on the re-execution information memory 15. Even during the period until the host 2 has prepared the additional input data B (B2), the operation may be continuously performed on other pieces of input data A3, A4, and A5.

When the host 2 prepares the input data B (B2), the accelerator 1 may be instructed to re-execute the operation by setting the re-execution input flag If to be true. In the re-execution path, the pipeline operation free from a stall may be performed.

Even if an application handles a large number of types of data sets and the data sets dynamically change during the operation of the application in the information processing apparatus (accelerator) of the first embodiment, the information processing apparatus may efficiently perform the pipeline operation. In other words, the pipeline operation is performed at an even higher speed. The advantage of the first embodiment may be enjoyed in other embodiments described below.

Figure 14A:
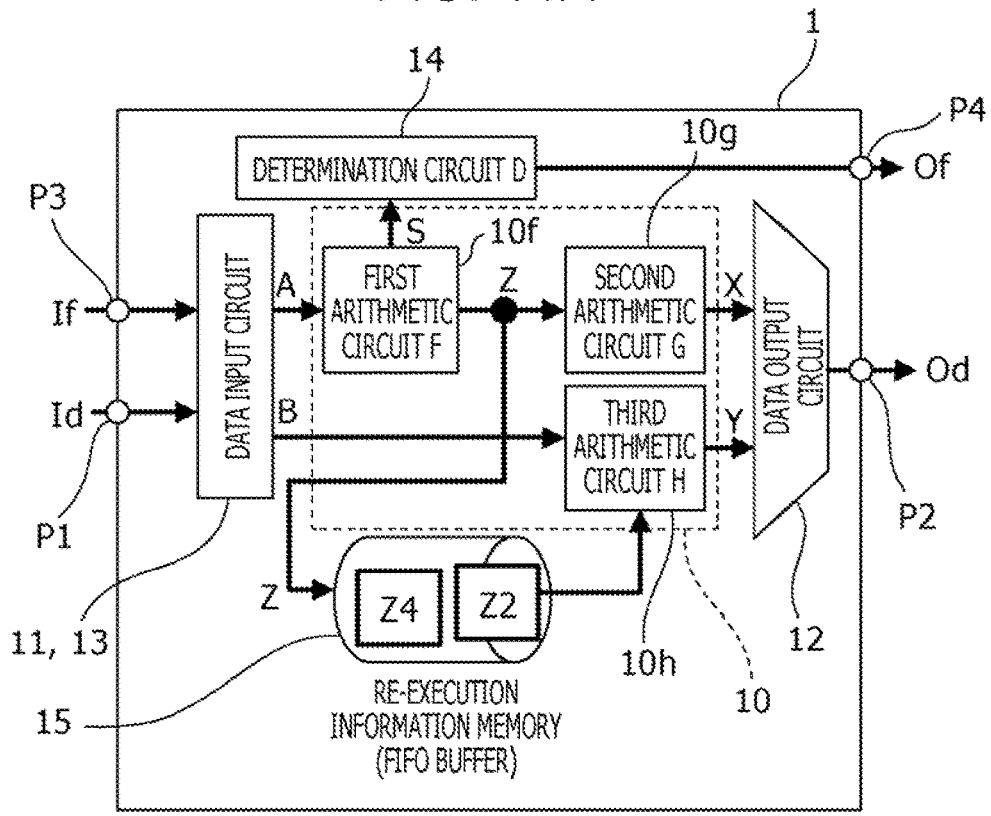
FIG. 14A and FIG. 14B illustrate an information processing apparatus of a second embodiment.
Figure 14B:
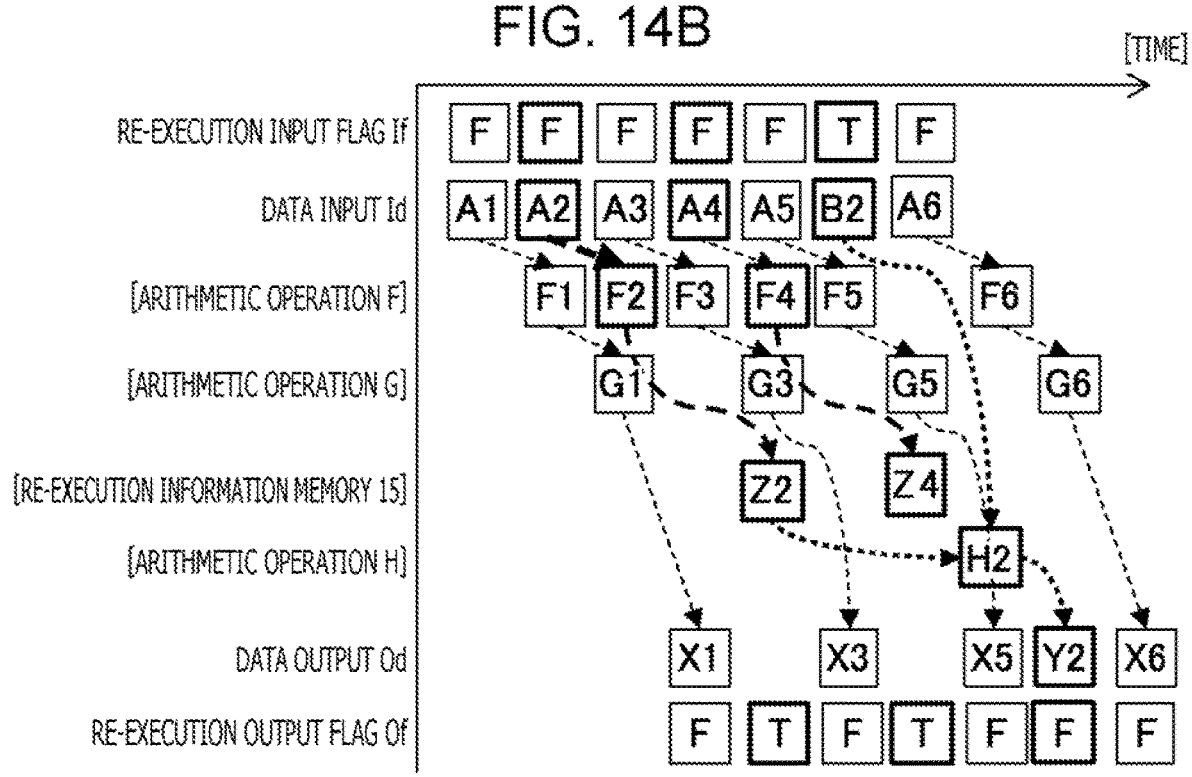

FIG. 14A and FIG. 14B illustrate an information processing apparatus of a second embodiment. To reduce the probability that the pipeline operation is stalled, the re-execution information memory 15 is enabled to store multiple pieces of re-execution information (Z2, and Z4). FIG. 14A schematically illustrates the configuration of the accelerator 1, and FIG. 14B illustrates an example of the pipeline operation performed by the accelerator 1.

Referring to FIG. 14A, in the information processing apparatus 1 of the second embodiment, the re-execution information memory 15 is a FIFO buffer, and is designed to store multiple pieces of intermediate data (information for re-execution) Z2, Z4, . . . . As illustrated in FIG. 14B (in the same way as described with reference to FIG. 13), the re-execution information memory 15 stores the intermediate data Z2 from the first arithmetic circuit 10f, and during the re-execution, the re-execution information memory 15 outputs the intermediate data Z2 together with the input data B2 to the third arithmetic circuit 10h. The third arithmetic circuit 10h performs the arithmetic operation H (H2), and outputs the output data Y2 together with the false re-execution output flag Of to the host 2.

FIG. 14B illustrates the case in which the operation on the input data A4 is to be re-executed. In this case, the intermediate data Z4 is stored on the re-execution information memory 15 that is the FIFO buffer. More specifically, the re-execution information memory 15 is the FIFO buffer, and if the re-execution is to be performed, the intermediate data is added to the tail of the data in the order of the intermediate data Z2, Z4, . . . on the FIFO buffer. During the re-execution, the leading data is successively output in the order of the intermediate data Z2, Z4, . . . . The multiple pieces of intermediate data Z2, Z4, . . . are stored on the FIFO buffer (re-execution information memory) 15 in this way. Even if a next re-execution is to be performed prior to the end of a previous re-execution, the pipeline operation is continued without a stall.

Figure 15A:
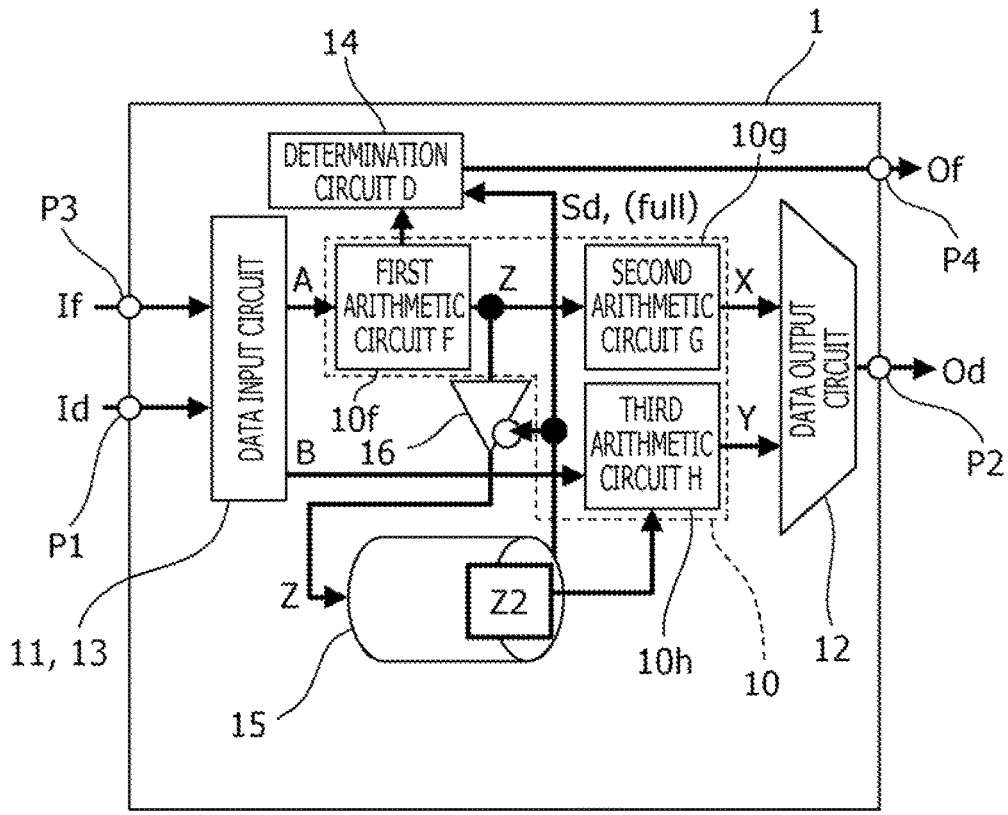
FIG. 15A and FIG. 15B illustrate an information processing apparatus of a third embodiment.
Figure 15B:
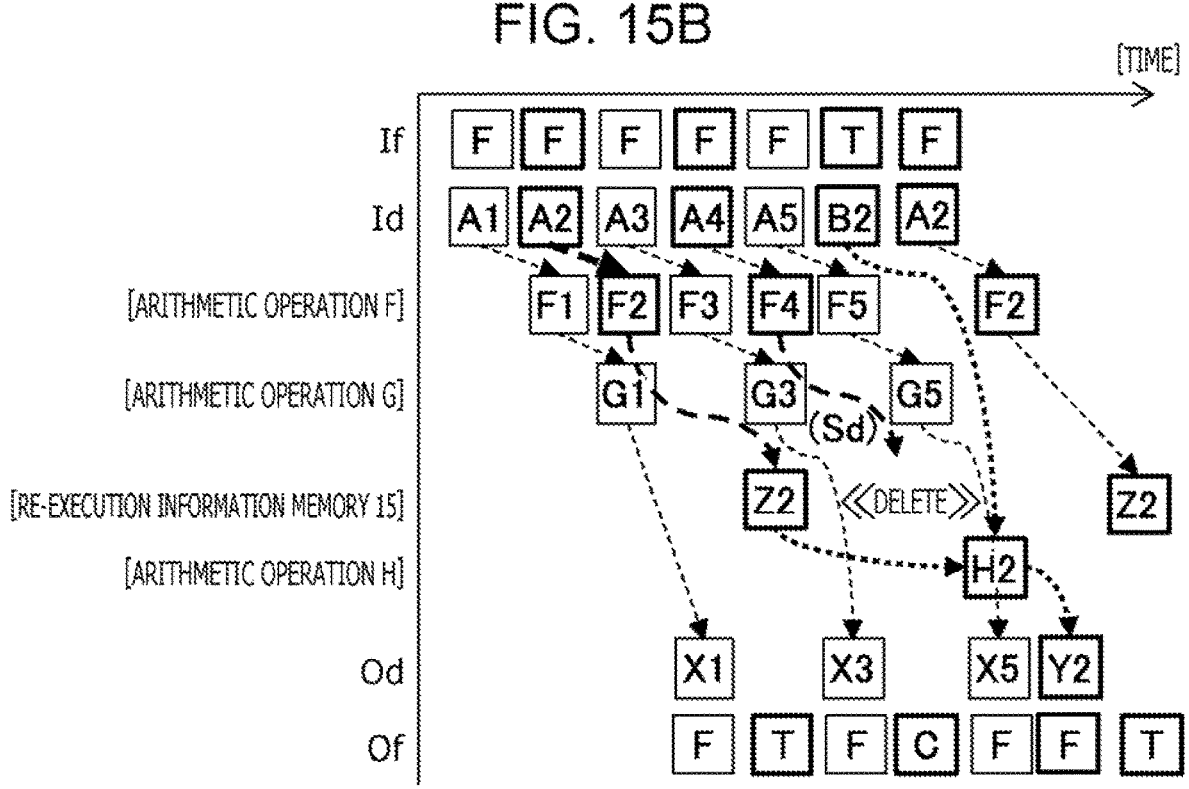

FIG. 15A and FIG. 15B illustrate an information processing apparatus of a third embodiment. The information processing apparatus of the third embodiment has a functionality that deletes the re-execution information if the information processing apparatus has detected no memory space available on the memory or a remaining memory space less than a predetermined value and close to zero memory space on the memory. FIG. 15A is a block diagram schematically illustrating the configuration of the accelerator 1, and FIG. 15B illustrates an example of the pipeline operation of the accelerator 1 of FIG. 15A.

By comparison of FIG. 15A with FIG. 14A, the information processing apparatus 1 of the third embodiment includes a buffer 16 that is controlled by a deletion control signal Sd and inserted between the output of the first arithmetic circuit 10f and the input of the re-execution information memory 15. The deletion control signal Sd is output if the re-execution information memory 15 has no further memory space or a remaining memory space less than a predetermined value and close to zero memory space. The deletion control signal Sd causes the buffer 16 to be inactive.

When the deletion control signal Sd is output, the buffer 16 deletes output intermediate data Z (Z4) from the first arithmetic circuit 10f instead of outputting the intermediate data Z (Z4) to the re-execution information memory 15. The deletion control signal Sd may be a signal full indicating that the FIFO buffer (the re-execution information memory) 15 is full. Also the deletion control signal Sd is input to the determination circuit 14. The determination circuit 14 generates the re-execution output flag O of cancel (C) and outputs the re-execution output flag Of of C to the host 2. The re-execution output flag Of Indicates that the intermediate data Z4 is not stored on the re-execution information memory 15 but is deleted and that the re-execution is not performed in this state. The host 2 thus recognizes that the intermediate data Z4 has been deleted.

If the full signal full (Sd) transitions to a high level "1" with no memory space available on the re-execution information memory 15 as illustrated in FIG. 15B, the buffer 16 is set to be inactive, and the intermediate data Z4 is deleted without being transmitted to the re-execution information memory 15. At the same time, in response to the full signal full, the determination circuit 14 outputs to the host 2 the re-execution output flag Of of C indicating the deleted intermediate data Z4. Upon receiving the re-execution output flag Of of C, the host 2 recognizes that the intermediate data Z4 responsive to the input data A4 has been deleted, and during the re-execution, the host 2 starts over with the operation on the input data A4. The deletion control signal Sd is not limited to the full signal full. As previously described, the deletion control signal Sd may be a signal that is output when the remaining memory space is going to be zero on the re-execution information memory 15 (such as an almost-full signal that is output when the memory is full if several pieces of data is further added).

Figure 16A:
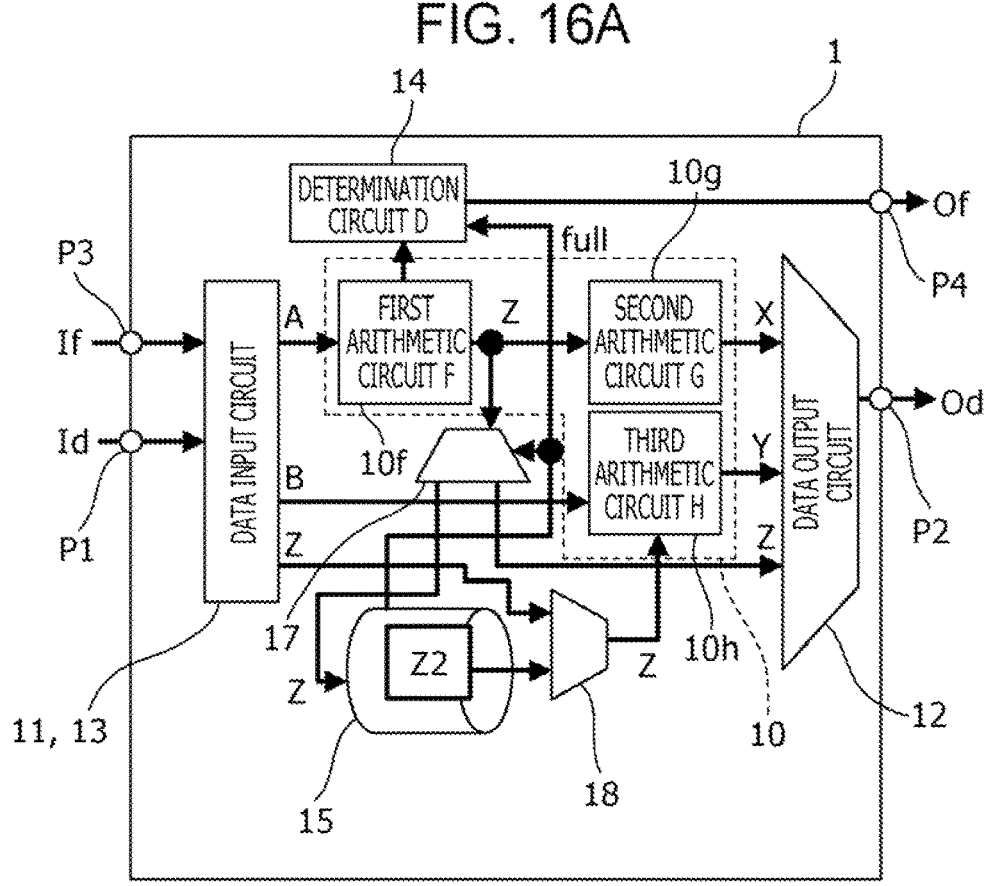
FIG. 16A and FIG. 16B illustrate an information processing apparatus of a fourth embodiment.
Figure 16B:
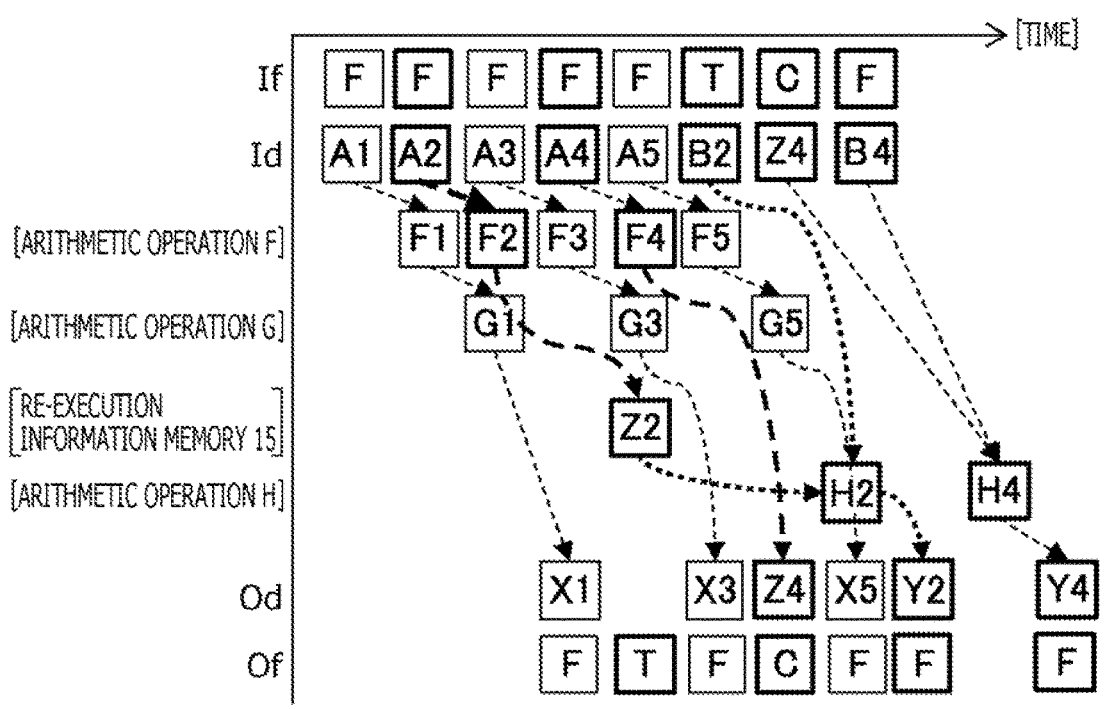

FIG. 16A and FIG. 16B illustrate an information processing apparatus of a fourth embodiment. The information processing apparatus of the fourth embodiment has a functionality that outputs new re-execution information to the host 2 for evacuation instead of deleting the new re-execution information. FIG. 16A is a block diagram schematically illustrating the configuration of the accelerator 1, and FIG. 16B illustrates an example of the pipeline operation of the accelerator 1 of FIG. 16A.

Referring to FIG. 16A, the accelerator 1 of the fourth embodiment includes multiplexers 17 and 18 in place of the buffer 16 of the third embodiment. The multiplexer 17 switches between inputting the intermediate data Z from the first arithmetic circuit 10f to the re-execution information memory 15 and outputting the intermediate data Z from the first arithmetic circuit 10f to the host 2 for evacuation. For example, if the full signal full is at a low level "0", the intermediate data Z is transferred to the re-execution information memory 15, and if the full signal full is at a high level "1", the intermediate data Z is output to the host 2 via the data output circuit 12 and the port 2 without being deleted.

The determination circuit 14 concurrently generates the re-execution output flag Of of C in response to the full signal full, and notifies the host 2 that the output intermediate data Z4 is not stored on the re-execution information memory 15 but appears in output data (Y4). The host 2 receives the re-execution input flag If of C, the intermediate data Z4, and the input data B4. The multiplexer 18 receives the output from the data input circuit 11 and the output from the re-execution information memory 15, and outputs a selected signal to the third arithmetic circuit 10h.

As previously described with reference to FIG. 12 and FIG. 13, the multiplexer 18 selects the output from the re-execution information memory 15 and supplies the selected output to the third arithmetic circuit 10h. If the multiplexer 18 receives the re-execution input flag If of C, the data Z4 and the data B4, the multiplexer 18 selects the data Z4 from the data input circuit 11 and supplies the data Z4 to the third arithmetic circuit 10h. Referring to FIG. 16A and FIG. 16B, the third arithmetic circuit 10h receives the data B4 from the data input circuit 11 together with the data Z4, performs the arithmetic operation H on the received data, and then outputs the output data Y4.

Figure 17A:
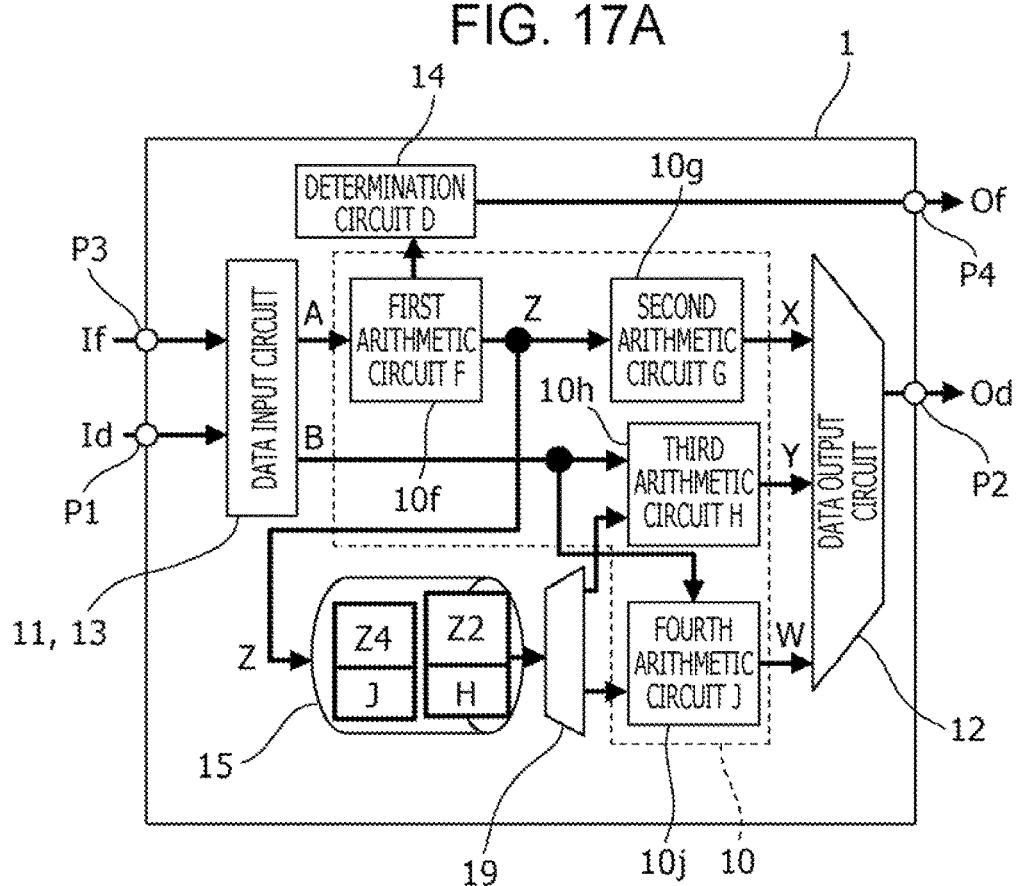
FIG. 17A and FIG. 17B illustrate an information processing apparatus of a fifth embodiment.
Figure 17B:
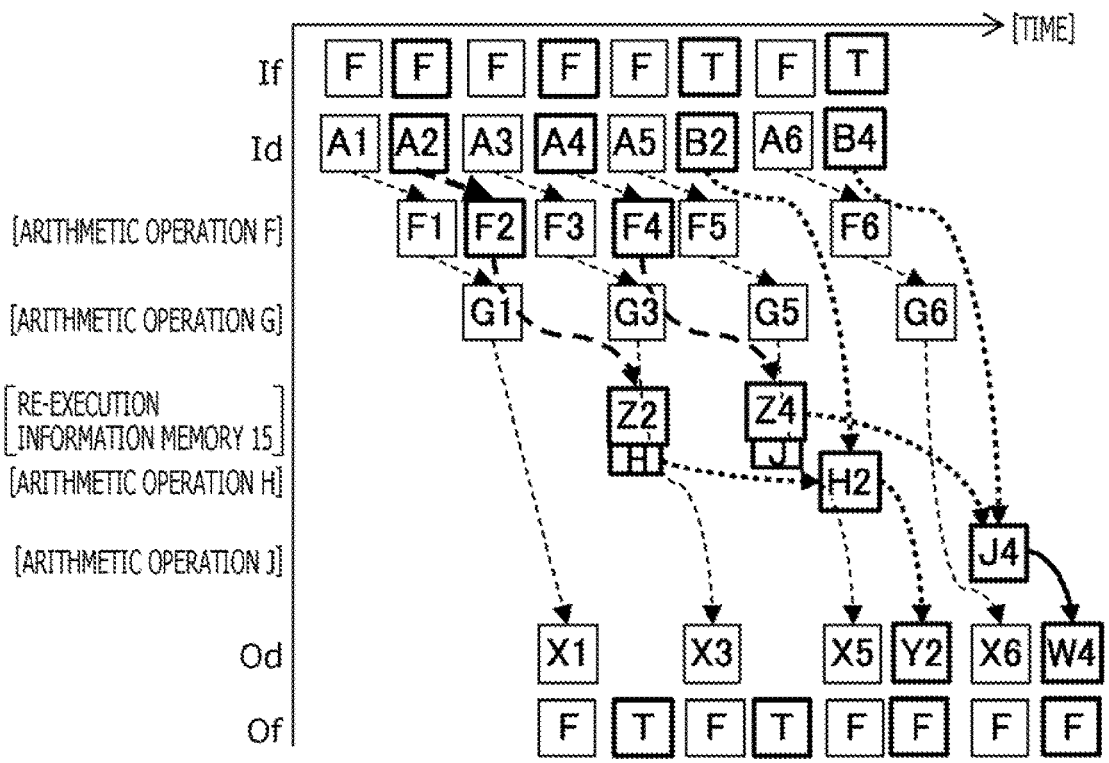

FIG. 17A and FIG. 17B illustrate an information processing apparatus of a fifth embodiment. The information processing apparatus of the fifth embodiment has a functionality that allows multiple types of re-execution to be performed by attaching additional information (such as a type of re-execution, a type of data in use) to the re-execution input flag If and the re-execution output flag Of. FIG. 17A is a block diagram schematically illustrating the configuration of the accelerator 1, and FIG. 17B illustrates an example of the pipeline operation of the accelerator 1 of FIG. 17A.

Referring to FIG. 17A, the accelerator 1 of the fifth embodiment includes a fourth arithmetic circuit 10j performing an arithmetic operation j, and a multiplexer 19. The multiplexer 19 supplies the output (intermediate data Z) of the re-execution information memory 15 selectively to the third arithmetic circuit 10h or the fourth arithmetic circuit 10j. Each of the third arithmetic circuit 10h and the fourth arithmetic circuit 10j performs the re-execution operation.

In the information processing apparatus 1 of the fifth embodiment, information concerning an arithmetic circuit in use is added to the output (intermediate data) Z of the first arithmetic circuit 10f stored on the re-execution information memory 15. More specifically, in the re-execution information memory 15, the intermediate data 22 includes the additional information that indicates that the arithmetic operation H is to be performed by the third arithmetic circuit 10h, and the intermediate data Z4 includes the additional information that indicates that the arithmetic operation J is to be performed by the fourth arithmetic circuit 10j.

When the intermediate data Z is read from the re-execution information memory 15, the intermediate data Z2 is input to the third arithmetic circuit 10h in accordance with the additional information, and the intermediate data Z4 is input to the fourth arithmetic circuit 10j in accordance with the additional information. For example, if the intermediate data Z2 is read from the re-execution information memory 15 as illustrated in FIG. 17B, the intermediate data Z2 is input to the third arithmetic circuit 10h via the multiplexer 19 in response to the additional information. The third arithmetic circuit 10h performs the arithmetic operation H on the intermediate data Z2 and the input data B2, thereby outputting the output data Y2. If the intermediate data Z4 is read from the re-execution information memory 15, the intermediate data Z4 is input to the fourth arithmetic circuit 10j via the multiplexer 19 in response to the additional information. The fourth arithmetic circuit 10j performs the arithmetic operation J on the intermediate data Z4 and the input data B4, thereby outputting the output data W4. The above operation examples have been described for exemplary purposes only. The pipeline operation may be performed at an even higher speed by storing on the re-execution information memory 15 the intermediate data Z with a variety of information added thereto.

Figure 18A:
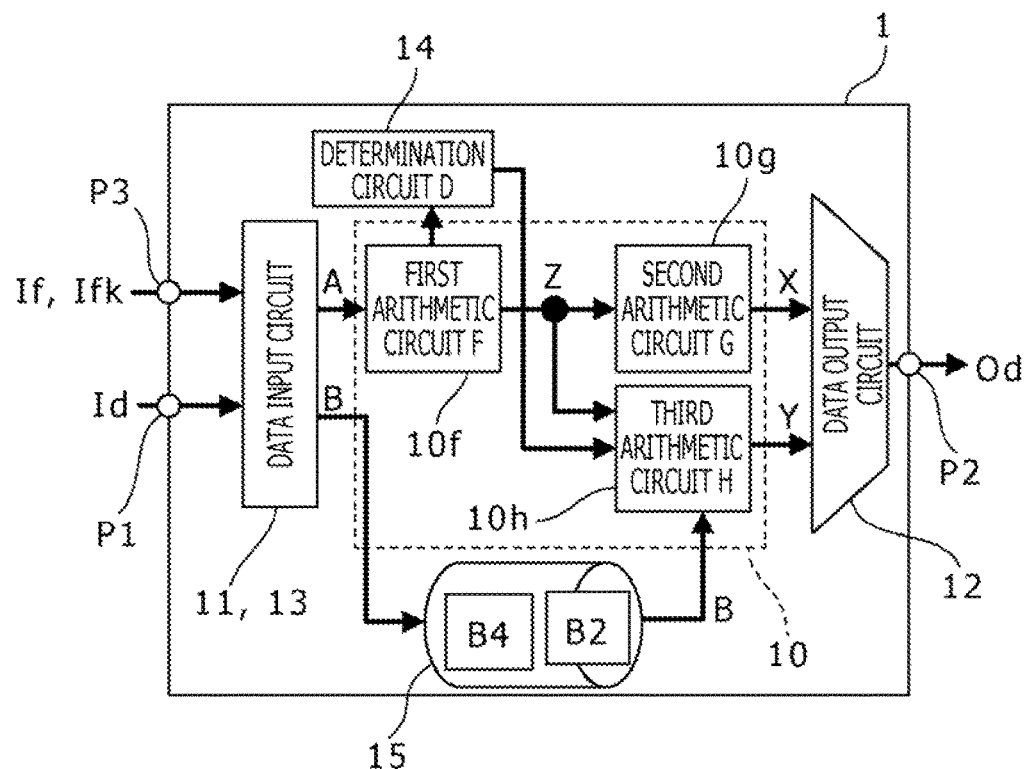
FIG. 18A and FIG. 18B illustrate an information processing apparatus of a sixth embodiment.
Figure 18B:
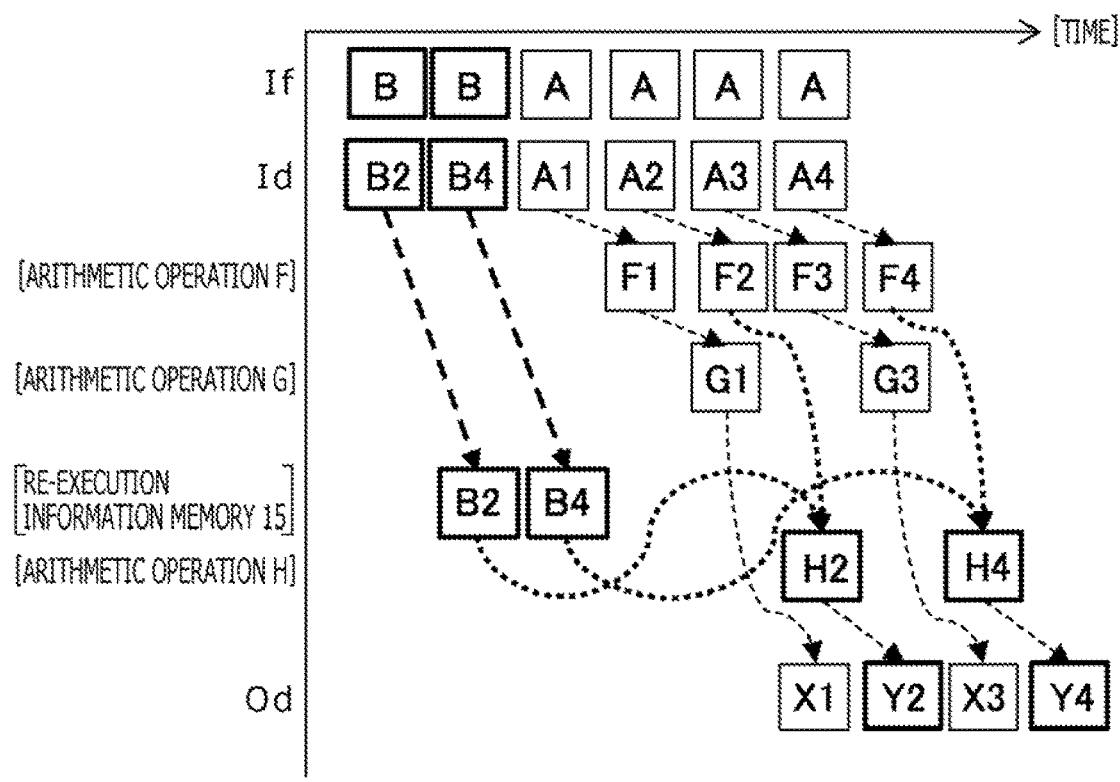

FIG. 18A and FIG. 18B illustrate an information processing apparatus of a sixth embodiment. The information processing apparatus of the sixth embodiment collects and inputs pieces of data for re-execution in advance, thereby reducing an exchange time period of re-execution flags with the host 2. FIG. 18A is a block diagram schematically illustrating the configuration of the accelerator 1, and FIG. 18B illustrates an example of the pipeline operation of the accelerator 1 of FIG. 18A.

Referring to FIG. 18A, the accelerator 1 of the sixth embodiment reads, in advance, additional input data B (B2 and B4) used for the re-execution and stores the additional input data B (B2 and B4) onto the re-execution information memory 15. A data type flag Ifk arranged in place of the re-execution input flag If notifies the accelerator 1 that the additional data B2 and B4 for the re-execution are input.

The determination by the determination circuit 14 as to whether the re-execution is to be performed is identical to the determination that has been described. The re-execution output flag Of is output to the third arithmetic circuit 10h rather than to the host 2 via the port P4. The third arithmetic circuit 10h uses the re-execution output flag Of to determine whether to read the additional data B2 and B4 from the accelerator 1. The sixth embodiment is desirably applied when the data involving the re-execution is learned in advance, for example.

The data that involves the re-execution may be found to be the input data A2 and A4 in advance as illustrated in FIG. 18B. When the re-execution that is going to be performed is detected, the additional data B2 and B4 may be collectively read. Even if the re-execution is going to be performed, the pipeline operation may be performed without a stall by reading the additional data B2 and B4 from the re-execution information memory 15. The time period of exchanging re-execution flags (If and Of) with the host 2 may thus be reduced.

The embodiments described above may be appropriately combined within a range that creates no difficulty. In the discussion of each of the embodiments, the configuration of the accelerator (the information processing apparatus) is simplified. The number of arithmetic circuits, the number of pieces of intermediate data, and the number of pieces of additional data may be more than those described above. Each of the embodiments described above may be implemented by a program that may be executed by an arithmetic processing device (such as the host 2 or the CPU 21).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    an arithmetic circuit that performs a pipeline operation on first data as an input; and
    a determination circuit that determines, based on pipeline operation results, whether to perform the pipeline operation by inputting, to the arithmetic circuit, second data different from the first data,
    wherein when the determination circuit has determined that the pipeline operation is to be performed by inputting the second data to the arithmetic circuit, the arithmetic circuit suspends the pipeline operation using the second data thereof, and performs the pipeline operation with the first data input until the second data is input, and when the second data is input, the arithmetic circuit resumes the pipeline operation using the second data,
    wherein the first data and the second data are data input from a host, and
    wherein the determination circuit
        receives a re-execution control signal responsive to the pipeline operation results of the arithmetic circuit, together with a re-execution input flag indicating whether the input data is to be used for a re-execution or not,
        determines whether to re-execute the pipeline operation with the second data input to the arithmetic circuit, and
        outputs output data that has been processed by the information processing apparatus, together with a re-execution output flag indicating whether to perform a re-execution on the output data.

2. The information processing apparatus according to claim 1, wherein the arithmetic circuit comprises:
    a first arithmetic circuit that performs a first arithmetic operation by receiving the first data;
    a second arithmetic circuit that performs a second arithmetic operation by receiving an output from the first arithmetic circuit; and
    a third arithmetic circuit that performs a third arithmetic operation by receiving the output from the first arithmetic circuit and the second data,
    wherein the information processing apparatus further includes a memory that stores the output from the first arithmetic circuit as intermediate data,
    wherein when the determination circuit determines that the pipeline operation is to be performed with the second data input to the arithmetic circuit, the intermediate data is stored on the memory, and
    wherein when the second data is input, the third arithmetic circuit performs the third arithmetic operation by receiving the intermediate data from the memory together with the second data.

3. The information processing apparatus according to claim 2, where the memory is a first-in first-out (FIFO) buffer that stores and outputs a plurality of pieces of the intermediate data on a FIFO basis.

4. The information processing apparatus according to claim 3, wherein when no further memory space is available on the memory or a memory space remaining on the memory is less than a predetermined value and close to zero memory space, a new piece of the intermediate data is deleted without being stored on the memory.

5. The information processing apparatus according to claim 3, when no further memory space is available on the memory or a memory space remaining on the memory is less than a predetermined value and close to zero memory space, a new piece of the intermediate data is output to the host for evacuation without being stored on the memory.

6. The information processing apparatus according to claim 2, wherein the memory stores, together with the intermediate data, additional information related to the re-execution that is performed using the intermediate data.

7. The information processing apparatus according to claim 2, wherein the memory receives the second data from the host and stores the second data before the determination circuit determines that the pipeline operation is to be performed by inputting the second data to the arithmetic circuit.

8. The information processing apparatus according to claim 1, comprising an accelerator including one of a field-programmable gate array, a graphic processing unit, and a general-purpose computing on graphic processing unit.

9. An information processing method of an information processing apparatus, the information processing method comprising:
  performing, by an arithmetic circuit, pipeline operation on first data as an input;
  determining, by a determination circuit and based on pipeline operation results, whether to perform the pipeline operation by inputting, to the arithmetic circuit, second data different from the first data;
  suspending, when the determination circuit has determined that the pipeline operation is to be performed by inputting the second data to the arithmetic circuit, the pipeline operation of the arithmetic circuit;
  performing the pipeline operation with the first data input until the second data is input; and
  when the second data is input, resuming the pipeline operation using the second data,
  wherein the first data and the second data are data input from a host, and
  wherein the determination circuit
    receives a re-execution control signal responsive to the pipeline operation results of the arithmetic circuit, together with a re-execution input flag indicating whether the input data is to be used for a re-execution or not,
    determines whether to re-execute the pipeline operation with the second data input to the arithmetic circuit, and
    outputs output data that has been processed by the information processing apparatus, together with a re-execution output flag indicating whether to perform a re-execution on the output data.

10. A non-transitory computer-readable storage medium for storing a program, the program causing a processor to perform an information processing method, the information processing method comprising:
  performing, by an arithmetic circuit, pipeline operation on first data as an input;
  determining, by a determination circuit and based on pipeline operation results, whether to perform the pipeline operation by inputting, to the arithmetic circuit, second data different from the first data;
  suspending, when the determination circuit has determined that the pipeline operation is to be performed by inputting the second data to the arithmetic circuit, the pipeline operation of the arithmetic circuit;
  performing the pipeline operation with the first data input until the second data is input; and
  when the second data is input, resuming the pipeline operation using the second data,
  wherein the first data and the second data are data input from a host, and
  wherein the determination circuit
    receives a re-execution control signal responsive to the pipeline operation results of the arithmetic circuit, together with a re-execution input flag indicating whether the input data is to be used for a re-execution or not,
    determines whether to re-execute the pipeline operation with the second data input to the arithmetic circuit, and
  outputs output data that has been processed by the information processing apparatus, together with a re-execution output flag indicating whether to perform a re-execution on the output data.

11. A non-transitory computer-readable storage medium for storing a program, the program causing a processor to execute a process, the process comprising:
  performing pipeline operation on first data as an input;
  determining, based on pipeline operation results, whether to perform the pipeline operation by inputting second data different from the first data;
  suspending, when it is determined that the pipeline operation is to be performed by inputting the second data, the pipeline operation;
  performing the pipeline operation with the first data input until the second data is input; and
  when the second data is input, resuming the pipeline operation using the second data,
  wherein the first data and the second data are data input from a host, and
    receiving a re-execution control signal responsive to the pipeline operation results, together with a re-execution input flag indicating whether the input data is to be used for a re-execution or not,
    determining whether to re-execute the pipeline operation with the second data, and
    outputting data that has been processed together with a re-execution output flag indicating whether to perform a re-execution on the output data.

* * * * *